United States Patent
Lydecker et al.

(10) Patent No.: US 10,721,700 B2
(45) Date of Patent: Jul. 21, 2020

(54) COMMAND EXECUTION SYNCHRONIZATION IN A NODAL NETWORK USING CONTROLLED DELAY TECHNIQUES

(71) Applicant: ABL IP HOLDING LLC, Conyers, GA (US)

(72) Inventors: Stephen H. Lydecker, Snellville, GA (US); Sajin George, Somerville, MA (US); Yenpao Lu, Cumming, GA (US); Mitri J. Abou-Rizk, Newton, MA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 16/126,540

(22) Filed: Sep. 10, 2018

(65) Prior Publication Data
US 2020/0084860 A1 Mar. 12, 2020

(51) Int. Cl.
*H04W 56/00* (2009.01)
*H05B 45/20* (2020.01)

(52) U.S. Cl.
CPC ....... *H04W 56/002* (2013.01); *H04W 56/003* (2013.01); *H04W 56/005* (2013.01); *H05B 45/20* (2020.01)

(58) Field of Classification Search
CPC . H04L 63/0861; H04L 43/0852; H04L 49/90; H04R 3/12; H04B 7/00; G06T 1/0021; H04W 41/0668; H04N 21/439; H04J 3/0602

See application file for complete search history.

(56) References Cited

U.S. PATENT DOCUMENTS

| 9,600,983 | B1 | 3/2017 | Lydecker et al. |
| 10,485,080 | B1 | 11/2019 | Lydecker et al. |
| 2013/0063042 | A1 | 3/2013 | Bora et al. |
| 2014/0029701 | A1* | 1/2014 | Newham ................ H04L 7/041 375/340 |
| 2015/0147067 | A1 | 5/2015 | Ryan et al. |

(Continued)

OTHER PUBLICATIONS

Notice of Allowance for U.S. Appl. No. 16/216,440, dated Jul. 23, 2019, 22 pages.

(Continued)

*Primary Examiner* — Iqbal Zaidi
(74) *Attorney, Agent, or Firm* — RatnerPrestia

(57) ABSTRACT

The disclosure provides an example of a system and a method for command execution synchronization in a nodal network. In one example, the method includes starting at a first time, propagating a message including an instruction and timestamp, in a nodal network including a plurality of wireless communication nodes (nodes). The timestamp identifies a second time later than the first time by an amount of time equal to or greater than a period of delay expected for propagation of the message through the nodal network to all of the nodes. The method also includes running a software (soft) clock in each of the nodes, the soft clocks being synchronized to within a timing error tolerance value of the soft clocks in other of the nodes and executing, by each respective one of the nodes, the instruction when the soft clock of the respective nodes reaches the second time identified by the timestamp.

18 Claims, 13 Drawing Sheets

(56) References Cited

U.S. PATENT DOCUMENTS

2017/0234727 A1\* 8/2017 O'Toole ................ G01J 1/0425
                                                          250/208.2
2017/0364348 A1   12/2017 Klitenik et al.
2018/0115435 A1    4/2018 George et al.
2018/0288390 A1\* 10/2018 Luo ..................... H04N 13/296

OTHER PUBLICATIONS

Non Final Office Action for U.S. Appl. No. 16/678,124, dated Jan. 21, 2020, 18 pages.
Notice of Allowance for U.S. Appl. No. 16/678,124, dated Mar. 17, 2020, 19 pages.

\* cited by examiner

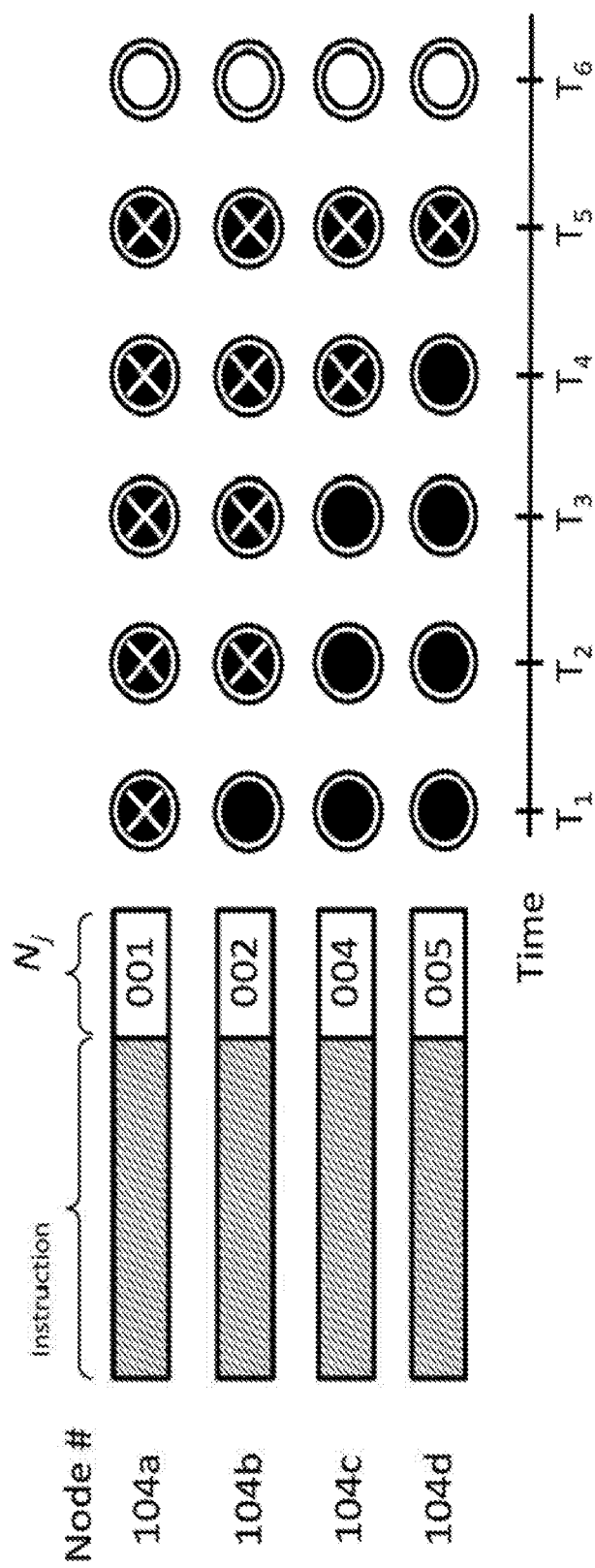

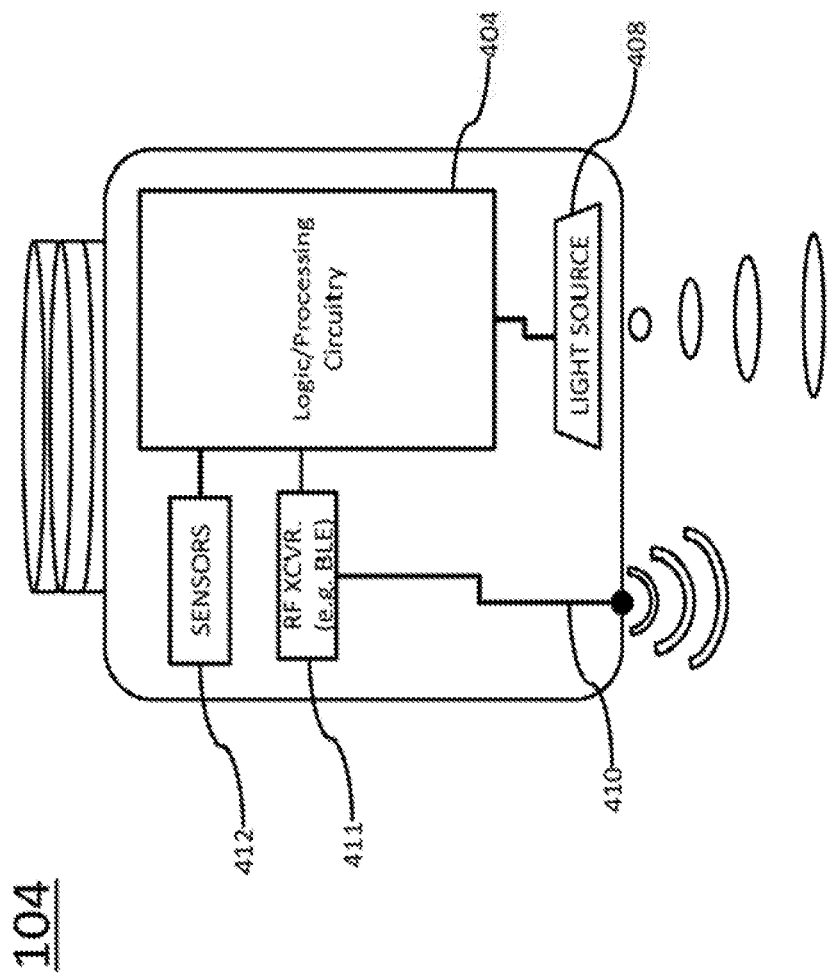

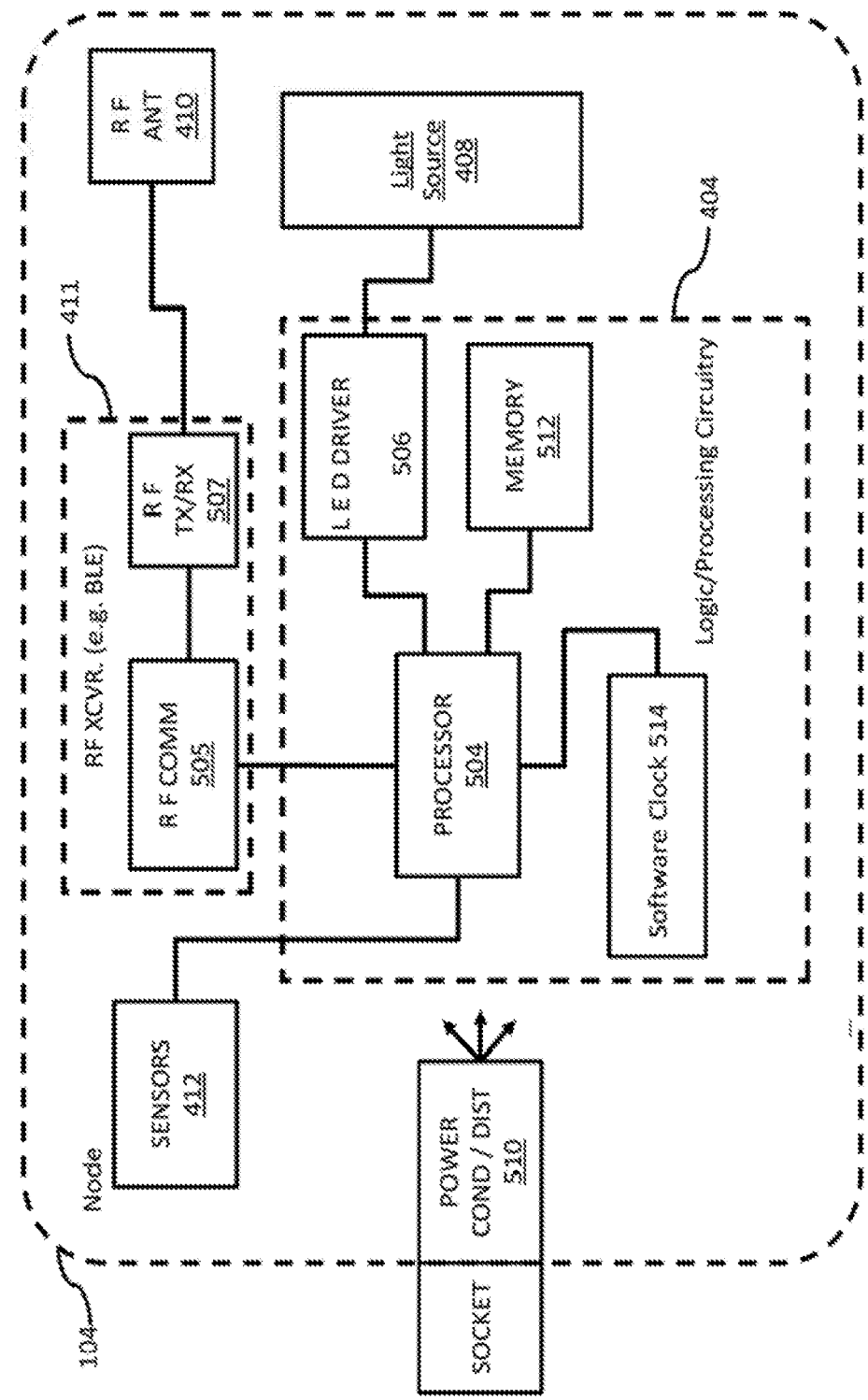

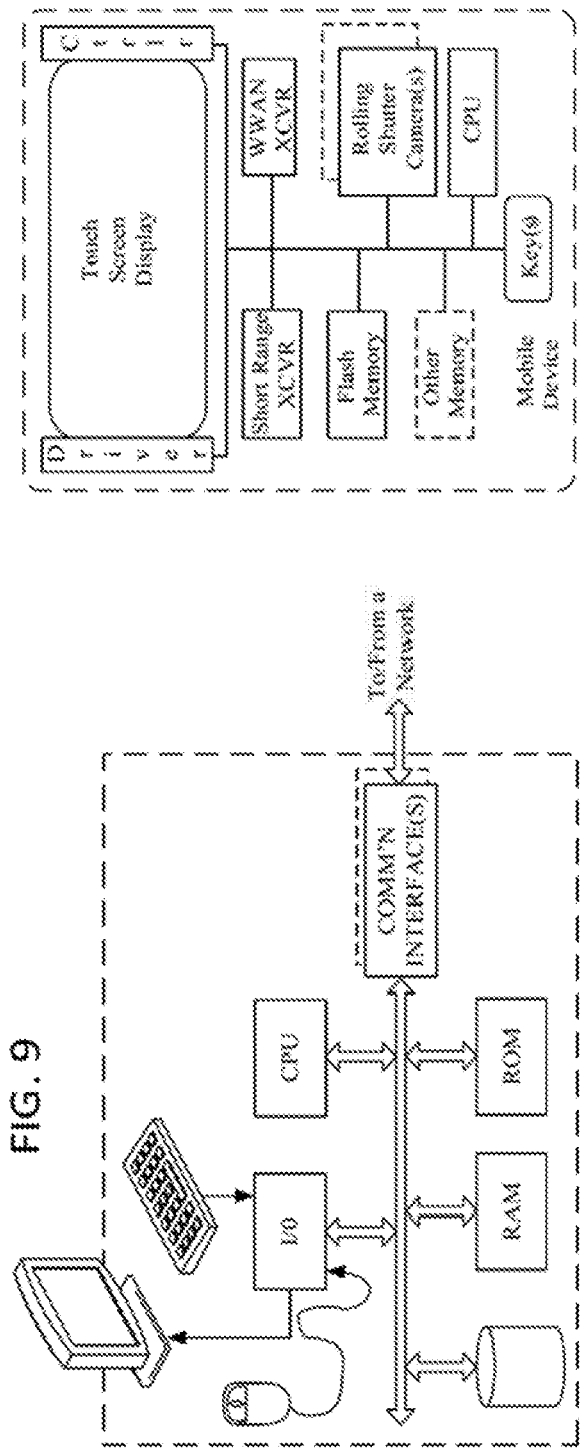
FIG. 9
FIG. 10
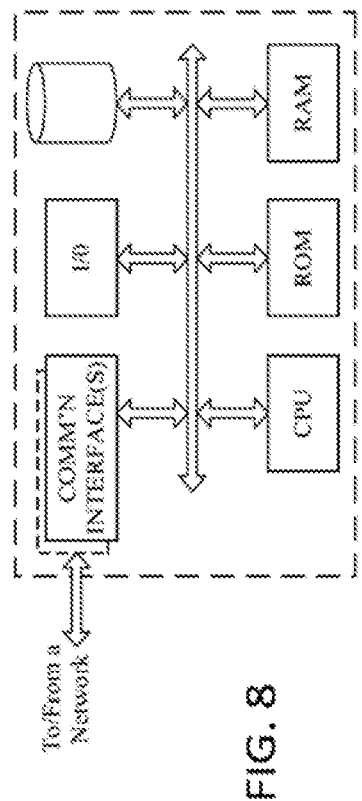
FIG. 8

COMMAND EXECUTION SYNCHRONIZATION IN A NODAL NETWORK USING CONTROLLED DELAY TECHNIQUES

TECHNICAL FIELD

The examples discussed below relate to methods, systems and apparatuses to provide substantially simultaneous command execution in a nodal network using controlled delay techniques.

BACKGROUND

Localized wireless networking for sensing and/or control purposes is becoming increasingly common. Fairly large area installations may use a mesh or other nodal wireless network topology for communications. In a wireless network having radio-frequency (RF) nodes, each node typically includes a receiver and transmitter, sometimes referred to collectively as a transceiver, offering capabilities for receiving and sending digital information over radio signals. The device at each node of the network may include a sensor and/or a controlled element, such as a light source. Where operation of the controllable elements is perceptible by a person in a location or promises served by the system, it may be desirable for some or all of the nodes to execute a common control operation (e.g. turn lights On or turn lights Off) sufficiently close in time that the perceptible operations of the devices at the nodes appears to be simultaneous to any person who may observe the nodes as they execute the control operation in common.

In one example of RF-networked luminaires, approximately several hundred luminaires in a big-box store interior are to be turned on, that is, a Lights On command is to be received and executed by all the luminaires. If the command is propagated node-to-node by normal network procedures, hopping opportunistically through the network, and if the command is furthermore executed by each luminaire upon receipt at each different node, then the lights will tend to turn on in a perceptibly non-synchronous manner: an erratic wave of turn-ons will propagate across the ceiling. This distracting outcome is termed the "popcorn effect" by analogy to the unpredictable, asynchronous popping of kernels in a popper. The popcorn effect can create unwelcome visual effects for any kind of perceptible light adjustment (on, off, dimming, color change). In some applications (e.g., stage lighting, studio lighting, TV and movie lighting), perceptible pop-corning may be completely unacceptable. Older lighting systems avoided pop-corning by direct hard-wiring of all luminaires to a power source. Flipping a switch sends the "command" (power) to all luminaires simultaneously. However, such technique does not assure substantially simultaneous command execution for network-disseminated digital commands in a wireless luminaire system e.g. that uses a wireless nodal network for command communication. Thus there is a need for a method of assuring command execution by devices in a nodal network that will be at least sufficiently close in time to appear simultaneous to a person observing execution of the command at a number of nodes of the system.

SUMMARY

Hence, there is a need for a system and method for assuring command execution by devices in a nodal network that is adequately simultaneous. For example, where the devices at nodes of the network execute a command or instruction by changing an operational condition in a manner that may be quickly perceived by a person, execution by the devices may be sufficiently simultaneous so that any timing differences between execution at various nodes is small enough that the execution appears to be simultaneous when observed by the person.

A method, for example, includes starting at a first time, propagating a message in a nodal network including a plurality of wireless communication nodes (nodes) in the nodal network, the message including an instruction and a timestamp. Each node among the plurality of nodes includes a light source. The timestamp identifies a second time later than the first time by an amount of time equal to or greater than a period of delay expected for propagation of the message through the nodal network to all of the nodes. The method also includes running a software (soft) clock in each of the nodes such that each soft clocks may be synchronized to within a timing error tolerance value of clocks in other of the nodes. The method further includes executing, by each respective one of the nodes, the instruction when the clock of the respective nodes reaches the second time identified by the timestamp. In one example, the executing the instruction by the nodes includes controlling a perceptible operation of the respective light source.

A system, for example, includes a plurality of wireless communication nodes distributed about a space. Each of the plurality of wireless communication nodes includes a light source; a wireless communication transceiver; and a microcontroller. The system also includes a gateway configured to communicate to each of the plurality of wireless communication nodes via a wireless flooding type network formed by the wireless communication transceivers. The gateway is configured to starting at a first time, propagate, a message via the wireless flooding type network, to each of plurality of wireless communication nodes. The message includes an instruction and a timestamp, which identifies a second time later than the first time by an amount of time equal to or greater than a period of delay expected for propagation of the message through to all of the nodes. Each respective wireless communication node is configured to receive, via the wireless flooding type network, the message, run the soft clock of the respective wireless communication node such that the soft clock of the respective wireless communication node is synchronized to within a timing error tolerance value of the soft clocks of other wireless communication nodes, and execute the instruction when the soft clock of the respective wireless communication node reaches the second time identified by the timestamp. In one example, to execute the instruction, each of the wireless communication nodes controls a perceptible operation of the respective light source.

Another method, for example includes introducing a message into a nodal wireless flooding typenetwork having a plurality of wireless communication nodes such that each of the plurality of nodes includes a light source. The message includes an instruction and a field containing a first value of a count related to number of transmissions through the nodal wireless flooding type network. The first value of the count defines a first countdown delay time for execution of the instruction. A first node among the plurality of nodes implements steps of receiving the message, recording the instruction and the first value of the count included in the field upon the receipt of the message and modifying the first value of the count by a predetermined amount to form a second value of the count. The predetermined amount used in modifying the first value of the count to form the second value of the count approximately corresponds to an amount of time for a node among the plurality of nodes to receive, modify, and retransmit a message. The first node further implements step of introducing a modified version of the message with the instruction and the second value of the count in the field into the nodal wireless flooding type network; and executing the instruction at the end of the first countdown delay time based on the recorded first value of the count such that executing of the instruction includes controlling a perceptible operation of the light source of the first node. A second node among the plurality of nodes, different from the first node, implements steps of receiving the modified message, recording the instruction and the second value of the count; and executing the instruction at a second countdown delay time based on the recorded second value of the count such that executing of the instruction at the second node includes controlling the perceptible operation of the light source of the second node.

Another system, for example includes a plurality of wireless communication nodes (nodes) distributed about a space. Each of the plurality of nodes include a light source, a wireless communication transceiver, and a counter. The system also includes a gateway configured to communicate to each of the plurality of nodes via a nodal wireless flooding type network formed by the wireless communication transceivers. The gateway is configured to introduce a message into the nodal wireless flooding type network. The message includes an instruction and a field containing a first value of count related to number of transmissions through the nodal wireless flooding type network and the first value of the count defines a first countdown delay time for execution of the instruction. A first node among the plurality of nodes is configured to receive the message, record the instruction and the first value of the count included in the field upon the receipt of the message, and run the respective counter to modify the first value of the count by a predetermined amount to form a second value of the count. The predetermined amount used to modify the first value of the count to form the second value of the count approximately corresponds to an amount of time for a node among the plurality of nodes to receive, modify, and retransmit a message. The first node is also configured to introduce a modified version of the message with the instruction and the second value of the count in the field into the nodal wireless flooding type network and execute the instruction at the end of the first countdown delay time based on the recorded first value of the count. In one example, the executing of the instruction comprises controlling a perceptible operation of the light source of the first node. A second node among the plurality of nodes, different from the first node, is configured to receive the modified message, record the instruction and the second value of the count and execute the instruction at a second countdown delay time based on the recorded second value of the count. In one example, the executing of the instruction at the second node includes controlling the perceptible operation of the light source of the second node.

A further system, for example includes a plurality of wireless communication nodes (nodes) distributed about a space. Each of the plurality nodes includes a light source, a wireless communication transceiver, and a counter. The system also includes a gateway configured to communicate to each of the plurality of nodes via a nodal wireless flooding type network formed by the wireless communication transceivers. The gateway is configured to introduce a message into the nodal wireless flooding type network. The message includes an instruction and a field containing a first value of count related to number of transmissions through the nodal wireless flooding type network. The first value of the count defines a first countdown delay time for execution of the instruction such that each of a first group of nodes among the plurality of nodes is configured to receive the message, record the instruction and the first value of the count included in the field upon the receipt of the message, and run the respective counter to modify the first value of the count by a predetermined amount to form a second value of the count. The predetermined amount used to modify the first value of the count to form the second value of the count approximately corresponds to an amount of time for a node among the plurality of nodes to receive, modify, and retransmit a message. The first group of nodes is also configured to introduce a modified version of the message with the instruction and the second value of the count in the field into the nodal wireless flooding type network; and execute the instruction at the end of the first countdown delay time based on the recorded first value of the count. In one example, executing of the instruction comprises controlling a perceptible operation of the light source of the first node. Each of a second group of nodes among the plurality of nodes such that the second group of nodes are different from the first group of nodes, is configured to receive the modified message, record the instruction and the second value of the count; and execute the instruction at a second countdown delay time based on the recorded second value of the count, such that the executing of the instruction at the second node includes controlling the perceptible operation of the light source of the second node.

Additional objects, advantages and novel features of the examples will be set forth in part in the description, which follows and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accordance with the present concepts, by way of example only, not by way of limitations. In the figures, like reference numerals refer to the same or similar elements.

FIG. 1B is a graphical representation of another example of a command execution synchronization technique utilizing a controlled delay implemented by the system of FIG. 1.

FIG. 4 is a simplified functional block diagram of an RF enabled modulatable node integrated in a lighting device that may be used in any of the examples of wireless networked lighting systems.

FIG. 5A is a somewhat more detailed functional block diagram of the example node integrated in a lighting device, configured to implement one example of the controlled delay technique provided by the system of FIG. 1.

FIG. 8 is a simplified functional block diagram of a computer that may be configured as a host or server, for example, to function as server in the system of FIG. 3.

FIG. 9 is a simplified functional block diagram of a personal computer or other work station or terminal device.

FIG. 10 is a simplified functional block diagram of a mobile device.

DETAILED DESCRIPTION

Figure 1:
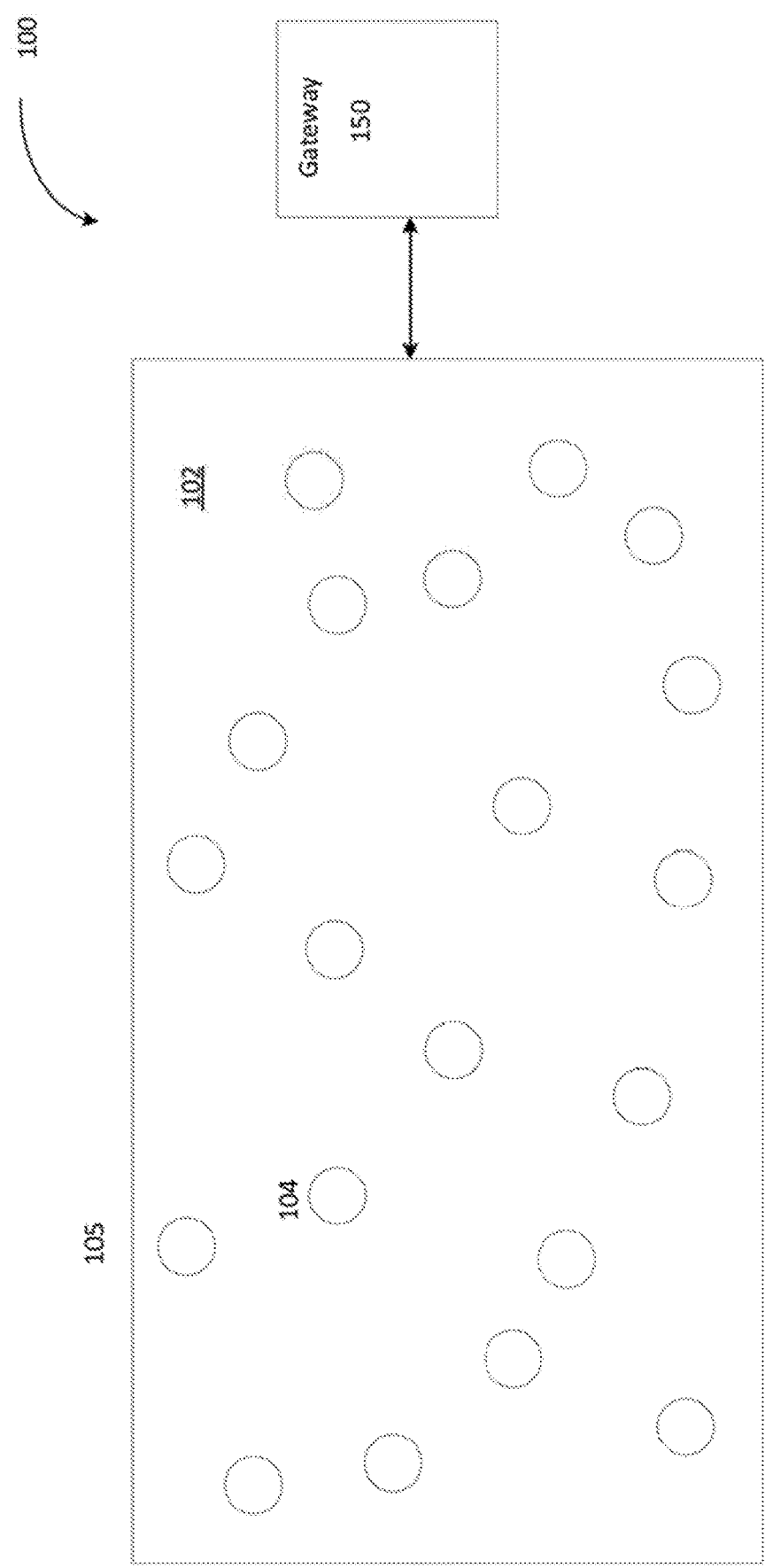
FIG. 1 is a high-level block diagram of an example of a system for implementing a command execution synchronization using a controlled delay technique.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The examples described below relate to command communication and execution techniques in the context of a network of wireless radio-frequency (RF) nodes, e.g., a network of RF nodes of which some number are integrated with luminaires. The end nodes have the capability to execute certain commands, such as light ON/OFF instructions in the luminaire example, via RF signals radiated by one or more other nodes in the network. The examples discussed in detail below encompass several methods for assuring perceptibly simultaneous command execution by two or more nodes in the nodal network. In two examples suited to flooding type RF networking, a fixed delay is provided between issuance of a command and the time of execution of the command by the nodes, causing execution to be approximately simultaneous across nodes. One example utilizes a timestamp, and the other example utilizes a hop or jump count.

The term "node" refers to a device, e.g. based on the RF, which includes, for example, "intelligence" or otherwise is an intelligent node. Such "intelligence" is provided, for example, via a central processing unit (CPU) implemented in a microcontroller or the like, and may include some sensing and/or control capability or other capabilities provided via the CPU or other processor within or otherwise collocated with the node. Many nodes may be included in or coupled to control lighting devices.

The nodes may be included in or coupled to a variety of different types of control devices. In the detailed examples, each node includes a light source (e.g. in a luminaire integrated with or connected to the node). As used herein, terms such as lighting device or luminaire are intended to encompass essentially any type of device with a controllable source that processes power to generate light, for example, for illumination of a space intended for use of or occupancy or observation, typically by one or more people or other types of living organism that can take advantage of or be affected in some desired manner by the light emitted from the device. A device at or coupled to a node, for example, may take the form of a lighting device such as a lamp, light fixture or other luminaire that incorporates a source, where the source by itself contains no intelligence or communication capability (e.g. LEDs or the like, or lamp ("regular light bulbs") of any suitable type) and an associated modulator and logic circuitry. Alternatively, a fixture or luminaire may be relatively dumb but include a source device (e.g. a "light bulb") that incorporates the logic, communication and modulation capabilities discussed herein. In most examples, the lighting device(s) in the nodes illuminate a service area to a level useful for a human in or passing through the space, e.g. regular illumination of a room or corridor in a building or of an outdoor space such as a street, sidewalk, parking lot or performance venue. However, it is also possible that one or more nodes in or on a particular premises served by a system of lighting devices have other lighting purposes, such as signage for an entrance or to indicate an exit. Of course, the lighting devices may be configured for still other purposes, e.g. to benefit human or non-human organisms or to repel or even impair certain organisms or individuals. The actual source in each lighting device may be any type of artificial light emitting unit.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals.

In the following detailed description, numerous specific details are set forth by way of examples. In one implementation, a controlled delay technique is provided for substantially simultaneous command execution by two or more nodes in a nodal network. In one example, the controlled delay technique includes providing a timestamp, e.g. related to a fixed delay between time of issuance of a command and the time of execution of the command by the nodes, causing execution to be approximately simultaneous across the nodes. In another example, the controlled delay technique includes providing hop or jump count effectively related to a variable time delay at each of the nodes, to postpone execution of the instruction in each node, also causing execution to be approximately simultaneous across the nodes. Details of the examples are provided herein below.

FIG. 1 illustrates, in a block diagram form, an example of a system 100 for providing a command execution synchronization using a controlled delay technique. The system 100 includes a nodal network 102 having a plurality of wireless communication nodes (nodes) 104 distributed about a space 105.

Each of the example nodes 104 includes at least a light source 408 (FIG. 4) and a wireless communication transceiver 411 (FIG. 4) details of which are provided below. In one implementation, the plurality of wireless communication transceivers 411 (FIG. 4) in the corresponding nodes 104 form a wireless network, e.g. wireless routing network or a wireless flooding network, which may involve hops or jumps through multiple nodes in order to distribute a message with a command to all of the nodes. The system 100 also includes a gateway 120, which is configured to communicate with each of the nodes 104 via the wireless flooding network. Although referred to as a gateway, the gateway 120 is an example of a system element that introduces a command for propagation through the wireless flooding network formed by the nodes 104. In one example, the gateway 120 is a computerized interface between the network 102 and another network (not shown), such as an internet which is coupled to a computer/server (not shown). In one implementation, a message is propagated into the network 102, e.g. by transmission from the gateway 120. Such message includes an instruction and a field for a value that relates to time delay, such as a timestamp value or a jump count value.

In one implementation, the controlled delay technique includes providing a fixed time delay which is fixed time delay value defined as a value between a time of issuance/propagation of the message and a time of execution of an instruction of the message by the nodes 104 in the network 102 causing execution of the instruction to be approximately simultaneous as described in greater detail herein below.

In one example, each of the nodes 104 includes a software clock (soft clock) 514 (FIG. 5A) and is synchronized with the soft clock 514 (FIG. 5A) of every other node 104 in the network 102 to within a timing error tolerance value ($2\delta$), which is minimal. $\delta$ is a maximum error tolerance value predetermined based on a layout of the network 102 (e.g. approximate number of nodes 104, approximate distance between the nodes 104, approximate distance between the gateway 120 and the nodes 104 etc.) so that execution of a perceptible operation at a number and possibly all of the nodes within a range of $2\delta$ ($\pm\delta$ relative to a target execution time) will appear as execution at the same time if a person observes such execution across the nodes. Synchronization of the nodes to true current time T may be achieved by a variety of means, e.g., a synchronization or clock-set pulse sent to all nodes 104 simultaneously at some time during a system calibration or setup procedure. The time kept by each node 104 is therefore in the range T$\pm\delta$. The synchronization technique and clocking functionality at the nodes are configured to keep $\delta$ small enough that events occurring at different times within an interval of duration $2\delta$ are perceived as simultaneous.

Also, the network delay, i.e., the maximum time required to propagate a message to all nodes 104 in the network 102, is determined to be $\Delta_L$. $\Delta_L$ is pre-determined based on the layout of the network 102. Accordingly, by the time $\Delta_L$ later than the start of propagation, each of the nodes 104 will receive the message.

In one example, at a first time ($T_I$), the gateway 120 propagates the message via the wireless flooding network, to each of the nodes 104. In one example, the nodal network 102 implements a flooding type protocol for the network communications. Hence, the message is "flooded" throughout the nodal network 102. In one example, the message is received by all the nodes 104 directly from the gateway 120. In another example, the message is received by some of the nodes 104 directly from the gateway 120 and retransmitted from some of the nodes 104 to one or more other nodes 104 that did not directly receive the message from the gateway 120.

In one example, the message includes the instruction and a field includes an action timestamp ($T_A$), which identifies a second time T+$\delta$ that occurs later than the first time, $T_I$ by the amount $\Delta_L$. As such, the T$\pm\delta$ is the fixed delay provided by the $T_A$. The nodes are configured such that when the soft clock of the respective node 104 reaches the second time, T+$\delta$, the node 104 executes the instruction. As discussed above, the $T_A$ is a later time value defining a time of execution of an instruction of the message by the nodes 104 and effectively defining a time delay between time of issuance of the message by the gateway during which the message propagates to the nodes for substantially simultaneous execution. In one example, $T_A$ is pre-determined based on the layout of the network 102. The instruction is a command to control perceptible operation of the light source 106 in a particular manner. Examples of such control include one or more of turning OFF, ON, dimming, flashing, color change and/or any other perceptible operations of the respective light source 106 of each node 104. As such, the timestamp ($T_A$) identifies a second or another time ($T_A+\delta$) later than the first time $T_I$ by a amount of time ($\Delta_L$), equal to or greater than a period of network delay expected for propagation of the message through all of the nodes (i.e. $T_A \geq T_I+\Delta_L$). Thus, when $T_A \geq T_I+\Delta_L$ (i.e. $T_A$ allows sufficient time for the message to reach all the nodes), all the nodes 104 in the network 102 should have received the command by the time $T_A$ and will execute the instruction substantially simultaneously, in the example, within the $T_A+\delta$.

In one example, each of the nodes 104 receives the message and runs or executes a software (soft) clock 514 (FIG. 5A) such that the soft clock of the respective node 104 that receives the message is synchronized to within the timing error tolerance value ($2\delta$) of the soft clocks 514 of other nodes 104. The timing error tolerance value ($2\delta$) corresponds to a timing difference sufficiently minimal that execution of the instruction by all of the nodes 104 when the soft clocks of all the nodes 104 reach the second/another time ($T_A+\delta$) identified by the timestamp would be perceived as a substantially simultaneous execution. Accordingly, when the soft clock of respective node 104 reaches the second/another time ($T_A+\delta$), the respective node 104 executes the instruction. In one example, the instruction is to control a perceptible operation of the light source 408 in the respective node 104.

Figure 1A:
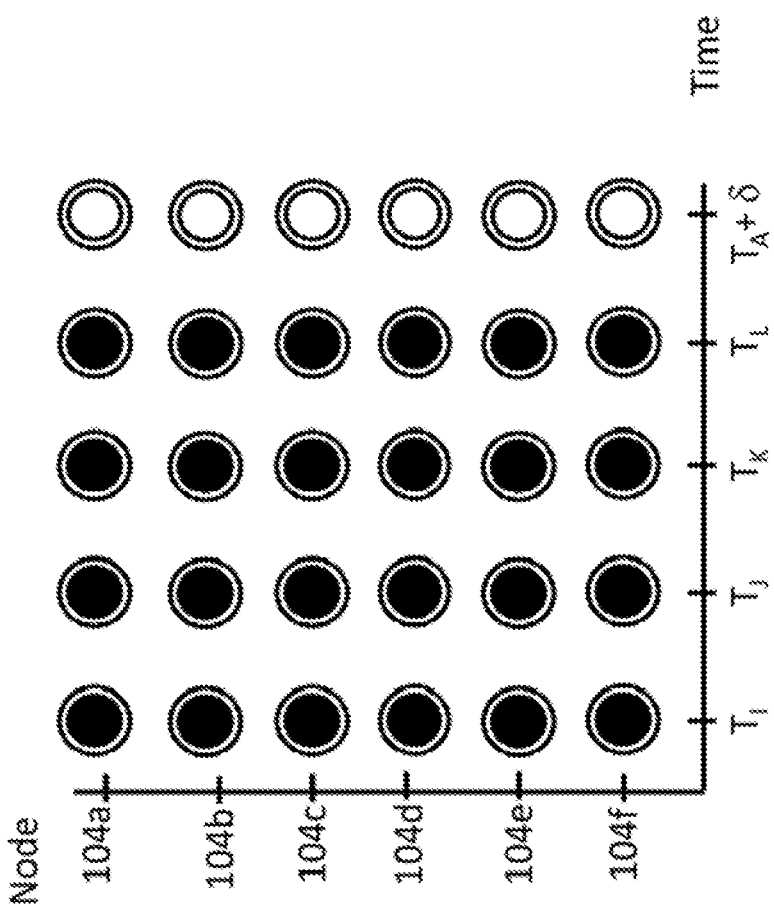
FIG. 1A is a graphical representation of an example of a command execution synchronization technique utilizing a controlled delay implemented by the system of FIG. 1.

Referring to FIG. 1A there is shown a graphical representation of an example of a command execution synchronization using the controlled time delay technique providing the fixed time delay value as described above. As illustrated, there is shown an example of six nodes 104a-104f at five different times, the first time, ($T_1$), a second time, ($T_j$) subsequent the first time, a third time, ($T_k$) subsequent the second time, a fourth time, ($T_l$) subsequent the third time and the another time ($T_A+\delta$) subsequent the fourth time.

In one example, at the first time, $T_1$ a message is propagated through the network of six nodes 104a-104f. The message includes the action timestamp $T_A$ identifying the another time ($T_A+\delta$), which occurs later than the $T_1$, $T_j$, $T_k$ and $T_l$, and an instruction including a turn ON the light source 106. In this example, the black filled nodes 104 illustrate lights OFF and unfilled nodes 104 illustrates lights ON. As such, at each of the second time, ($T_j$), the third time, ($T_k$) and the fourth time, ($T_l$) lights remain OFF regardless of whether each of the six nodes 104a-104f has received the message yet or not. Here $T_J<T_K<T_L<T_A \geq T_J+\Delta_L$, where $\Delta_L$ as discussed above is the network delay. Nominally, all the six light sources 106 in their respective six nodes 104a-104f would turn ON at the time, $T_A$, although due to inter-nodal clock differences ($\delta$), the six light sources 106 in their respective six nodes 104a-104f are certain to complete the turning ON until the another time ($T_A+\delta$), which is perceived as substantially simultaneous turn ON of all the six light sources 106.

In another implementation, the controlled delay technique includes providing a variable time delay, such as a countdown delay time, which is a value varied for each node 104 in the network 102 and defines a length of time for postponing execution of the instruction by the each node 104 as described in greater detail herein below.

In one example, a time delay, $T_D$, is pre-determined for all the nodes 104 in the network 102. $T_D$, is the amount of time it takes for the respective node 104 to receive, execute and retransmit the message within the network 102. In one example, the gateway 120 introduces a message into the network 102. As discussed above, in one example, the nodal network 102 implements a flooding type routing for the network communications. Hence, the message is "flooded" throughout the nodal network 102.

In one implementation, message includes an instruction and a field containing a value of a count ($N_j$), which is variable and is related to a number of transmissions (hops) through the nodal wireless flooding network 102. The value of count defines a countdown delay time for execution of the instruction at each respective node 104. In one example, the instruction includes to control the light source 106. Each of the nodes 104 includes a counter (FIG. 5B) that modifies the value of the count $N_j$.

As discussed above, the gateway 120 introduces a message among into the network 102. The message includes the instruction and the field includes the value of a count, $N_j$, which in this scenario is 0 since the message is introduced to the network 102 for the first time. In one example, a first node 104a receives the message and records the instruction and the $N_j=0$. The first node 104a runs a counter (FIG. 5B), which modifies the $N_j=0$ by one count generating a modified version of the message. For example, the first node 104a increments the value of $N_j=0$ by one such that current value of $N_j=1$ and the modified version of the message includes the instruction and the field includes the current value of $N_j=1$. The first node 104a transmits the modified version of the message into the network 102 and executes the instruction at the end of the countdown delay time based on the recorded value of the $N_j=0$. The modified version of the message is received by a second node 104b, which records the instruction and the current value of $N_j=1$. In one example, the second node 104b runs a counter (FIG. 5B), which further modifies the current value of $N_j=1$ by one count, such that the field includes the current value of $N_j=2$. The second node 104b executes the instruction at the end of the countdown delay time based on the recorded value of $N_j=1$ and transmits the further modified message and process continues until all the nodes 104 in the network 102 have received the message. As such, $N_j$ functions to define the countdown delay time that is specific to each node 102 as described further in detail herein below.

In one example, the network 102 contains N number of nodes 104 such that $N<N_j$ i.e. it will take no more than N retransmissions to get the message to every node in the network 102. In this example, the nodes 104 of the network 102 are programmed to execute instructions in a specific class (e.g., all instructions that visibly alter lighting) after a countdown delay time. In one example, the countdown delay time is determined as a difference between some maximum delay $N_{max} \leq N$ and the $N_j$, the value of the count as received by each particular node 104. $N_{max}$ is maximum number of retransmissions (hops) needed to transmit the message to all the nodes in the network 102. In one example, the $N_{max}$ is pre-determined based on the layout of the network 102. In one example, the countdown time delay for the node 104 to delay execution of the instruction is $T_D \times (N_{max}-N_j)$. For example, if $T_D=10$ msec, $N_{max}=100$, and node 104g receives the message with $N_j=40$, node 104g will execute the instruction is at the end of $10 \times (100-40)$ msec=600 msec. Thus, the countdown delay time for the node 104g to execute is at approximately 600 ms. In one example, other nodes (i.e. nodes 102a-102n) in the network 102 function similarly based on their respective values of $N_j$. As such, the countdown delay time for the respective node 104 is proportional to the respective value of $N_j$. Accordingly, the countdown delay time is determined for each specific node 104 in the network 102, which is a length of time for postponing the execution of the instruction by the each specific node 104 after the receipt of the message or the modified version of the message by the respective node 104.

Referring to FIG. 1B there is shown a graphical representation of an example of a command execution synchronization using the controlled time delay technique providing the variable time delay as described above. In this example, the instruction in the message is to turn ON the light source in each of the four nodes 104a-104d. Black-filled circles represent nodes with their respective light sources OFF, white-filled circles represent nodes with their respective light sources ON, and black-filled circles with a white "X" signify nodes that have received the message but have not yet turned ON. As discussed above, $N_{max}$ is maximum number of retransmissions (hops) needed to transmit the message to all the nodes in the network 102, which in this example is 6.

As illustrated, there is shown an example of four nodes 104a-104d at four different values of the count $N_j$, and times (T1-T6) which represents the time when the hops occurs. As discussed above, $N_j$ represents the value of the count, i.e. number of hops, which varies for each node. In one example, the message is propagated from the gateway 120 into the network 102. Since the message is introduced for the first time into the network, the value of $N_j=000$. In one example, the node 104a is the first node to receive the message at a time $T_1$, which modifies the Nj to increment the count value by 1 due to one transmission (hop) from the gateway 120), resulting in $N_j=001$. The node 104a transmits the modified version of the message including the $N_j=001$, which is received by node 104b at a time $T_2$, which also modifies the Nj by incrementing the count value by 1 due to one transmission (hop) from the node 104a, resulting in $N_j=002$. The node 104b transmits the modified version of the message including the $N_j=002$, which is received by the node 104c at a time T4, i.e. after two transmissions (hops). The node 104c further modifies the Nj incrementing the count value by 2 due to two transmissions (hops) from the node 104b, resulting in the $N_j=004$. The node 104c transmits the message including the $N_j=004$, which is received by the node 104d at time $T_5$, which even further modifies the message by increment the count value by 1 due to one transmission (hop) from the node 104c, resulting in the N=5. Thus, at time $T_5$, all the nodes 104a-104d have received the message.

Since the $N_{max}$, i.e. maximum number of transmission (hops) is six (6), it is determined that the node 104*d* is the last node in the network 102 to receive the message, and thus message is not transmitted further in the network 102. As discussed above, each node executes the instruction after $N_{max}$-$N_J$ counts, and the interval between each of the $T_1$, $T_2$ etc. is 1 hop delay, $T_D$ (some number of milliseconds). As such, node 104*a* executes after 6−1=5 hop counts, node 104*b* executes after 6−2=4 hop counts, node 104*c* executes after 6−4=2 hop counts, and node 104*d* executes after 6−5=1 hop count and thus by the time T6, all the nodes 104*a*-104*d* have executed the instruction. Accordingly, the result is approximately simultaneous command execution.

In one implementation, one or more of the nodes 104 are divided into first and second groups such that the one or more nodes in the first group are different from the one or more nodes in the second group. For example, the first group includes two nodes 104*a* and 104*b* and the second group includes three of the nodes 104*c*, 104*d* and 104*e*. In one implementation, each of the first group of nodes 104*a* and 104*b* receives a message among the plurality of messages and records the instruction and the $N_J$ in the message, and modifies the $N_J$ incrementing the value of $N_J$ and transmits modified version of message including the incremented value of $N_J$ to the second group of nodes, 104*c*, 104*d* and 104*e*. In another implementation, each of the second group of nodes 104*c*, 104*d* and 104*e* receives the modified version of message and further increments the incremented value of $N_J$. In one example, each of the nodes 104*a* and 104*b* in the first group and each of the nodes 104*c*, 104*d*, 104*e* in the second group executes the instruction at the end of their corresponding countdown time delay, i.e. based on the value of $N_J$ and the incremented value of $N_J$ respectively. As discussed above, the countdown time delay is $T_D \times (N_{max} - N_J)$. Also, as discussed above, $T_D$ and $N_{max}$ are fixed predetermined values, thus the countdown y time delay for each of the nodes 104*a* and 104*b* in the first group and each of the nodes 104*c*, 104*d* and 104*e* in the second group is based on its corresponding recorded $N_J$ value.

In one example, each message among the plurality of messages is identified by a message identification (ID) unique to that message. In one example, one or more nodes 104 may receive multiple different messages by different routes in the network 102. In one example, the modified version of the message will have the same ID, such that when the node retransmits the same message with the modified version (i.e. new value of the count, $N_J$) the message ID will remain the same. Accordingly, each message that is propagated and retransmitted in the network will have the same ID. Thus one or more nodes 104 may check the message ID of each of the message including the messages with the modified version to determine that the messages has already been received and thus function to ignore such repeated messages.

Figure 2A:
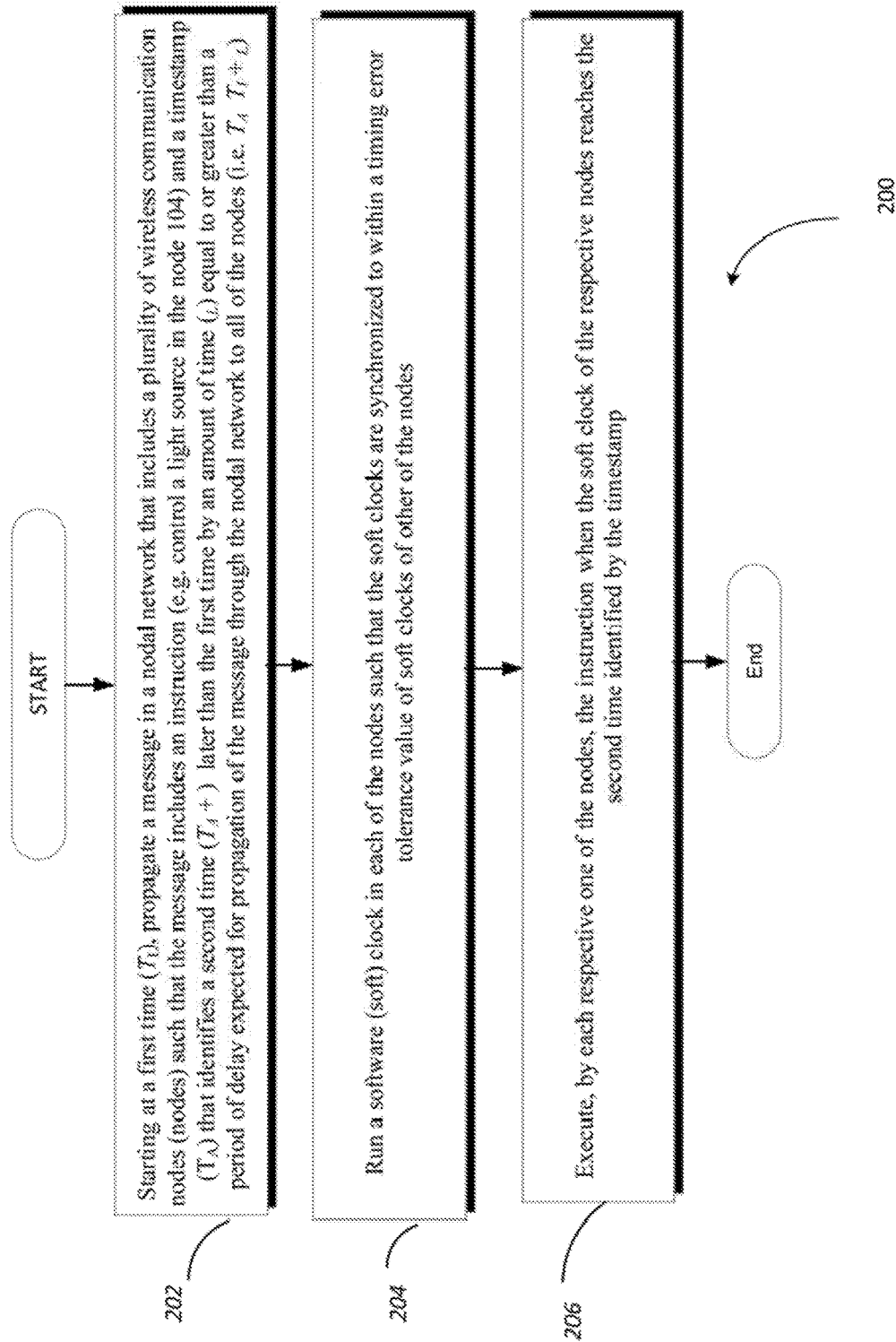
FIG. 2A is a flowchart of an example of a process for providing command execution synchronization in a nodal network using a controlled delay technique.

FIG. 2A is a flow chart depicting an example of a method 200 for providing substantially simultaneous command execution using the controlled delay technique with the fixed time delay. In one example, the method 200 is implemented by the system 100 of FIG. 1.

At block 202, starting at a first time ($T_I$), propagate a message in a nodal network that includes a plurality of wireless communication nodes (nodes) such that the message includes an instruction (e.g. control a light source in the node 104) and a timestamp ($T_A$) that identifies a second time ($T_A$+δ) later than the first time by an amount of time ($\Delta_L$) equal to or greater than a period of delay expected for propagation of the message through the nodal network to all of the nodes (i.e. $T_A \geq T_I + \Delta_L$). In one example, each node among the plurality of nodes includes a light source and a software (soft) clock. At block 204, run a software (soft) clock in each of the nodes such that the soft clocks are synchronized to within a timing error tolerance value (2δ) of soft clocks in other of the nodes. At block 206, execute, by each respective one of the nodes, the instruction when the soft clock of the respective nodes reaches the second time identified by the timestamp. In one example, the execution of the instruction by the node includes controlling a perceptible operation of the light source, of the node.

Figure 2B:
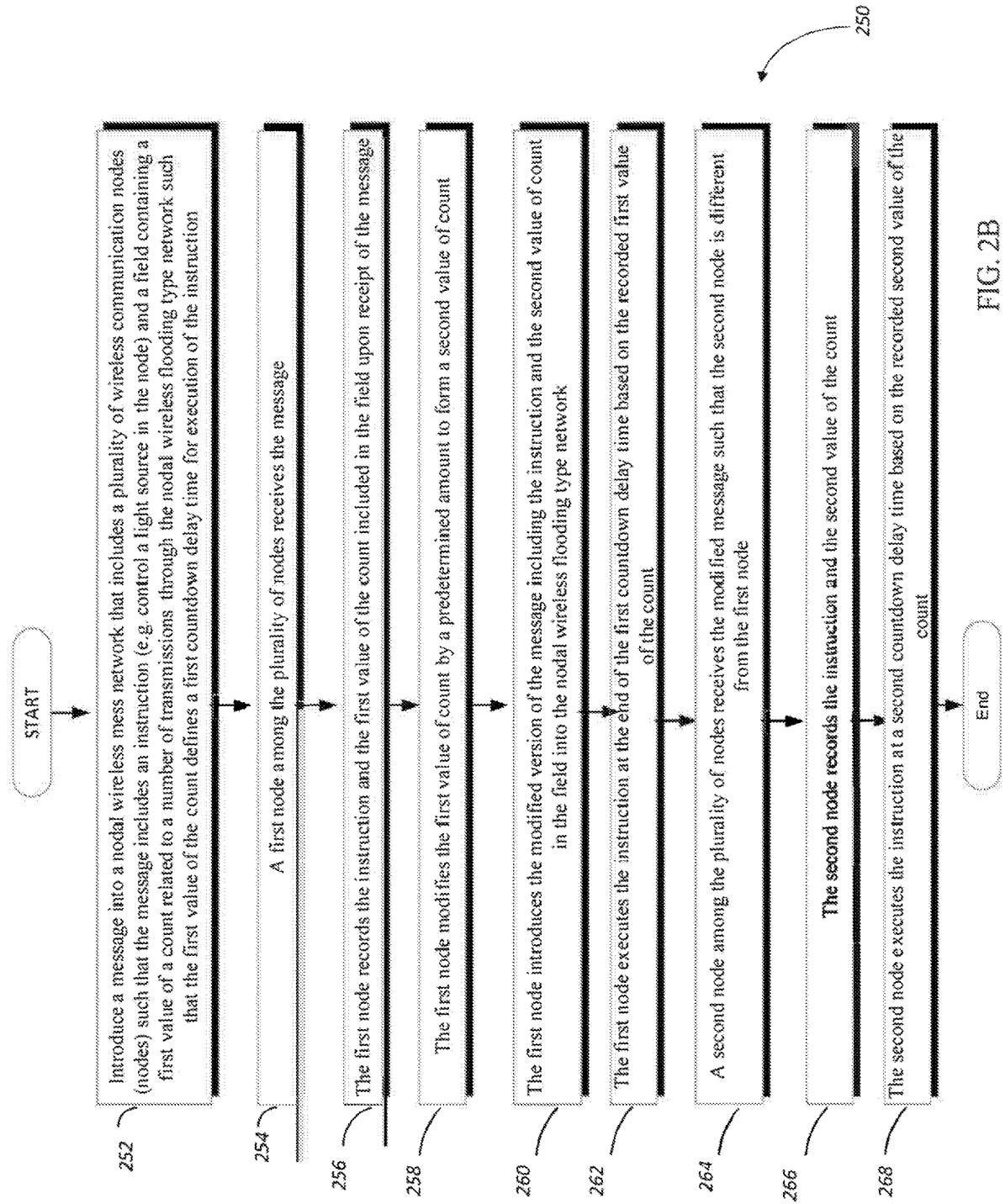
FIG. 2B is a flowchart of another example of a process for providing command execution synchronization in the nodal network using the controlled delay technique.

FIG. 2B is a flow chart depicting an example of a procedure 250 for providing substantially simultaneous command execution using the controlled delay technique with the variable time delay. In one example, the method 250 is implemented by the system 100 of FIG. 1.

At block 252, introduce a message into a nodal wireless mess network that includes a plurality of wireless communication nodes (nodes) such that the message includes an instruction (e.g. control a light source in the node 104) and a field containing a first value of a count related to a number of transmissions through the nodal wireless flooding type network such that the first value of the count defines a first countdown delay time for execution of the instruction. At block 254, a first node among the plurality of nodes receives the message. At block 256, the first node records the instruction and the first value of the count included in the field upon receipt of the message. At block 258, first node modifies the first value of count by a predetermined amount to form a second value of count. The pre-determined amount used in modifying the first value of count to form the second value of count approximately corresponds to an amount of time for a node among the plurality of nodes to receive, modify and retransmit the message. At block 260, the first node introduces the modified version of the message including the instruction and the second value of count in the field into the nodal wireless flooding type network. At block 262, the first node executes the instruction at the end of the first countdown delay time based on the recorded first value of the count. In one example, the execution of the instruction includes controlling a perceptible operation of the light source of the first node. At block 264, a second node among the plurality of nodes receives the modified message such that the second node is different from the first node. At block 266, the second node records the instruction and the second value of the count. At block 268, the second node executes the instruction at a second countdown delay time based on the recorded second value of the count. In one example, the second countdown delay time occurs after the first countdown delay time. The second count value defines the second countdown delay time for execution of the instruction in the modified message. In one example, the execution of the instruction includes controlling a perceptible operation of the light source of the second node.

Figure 3:
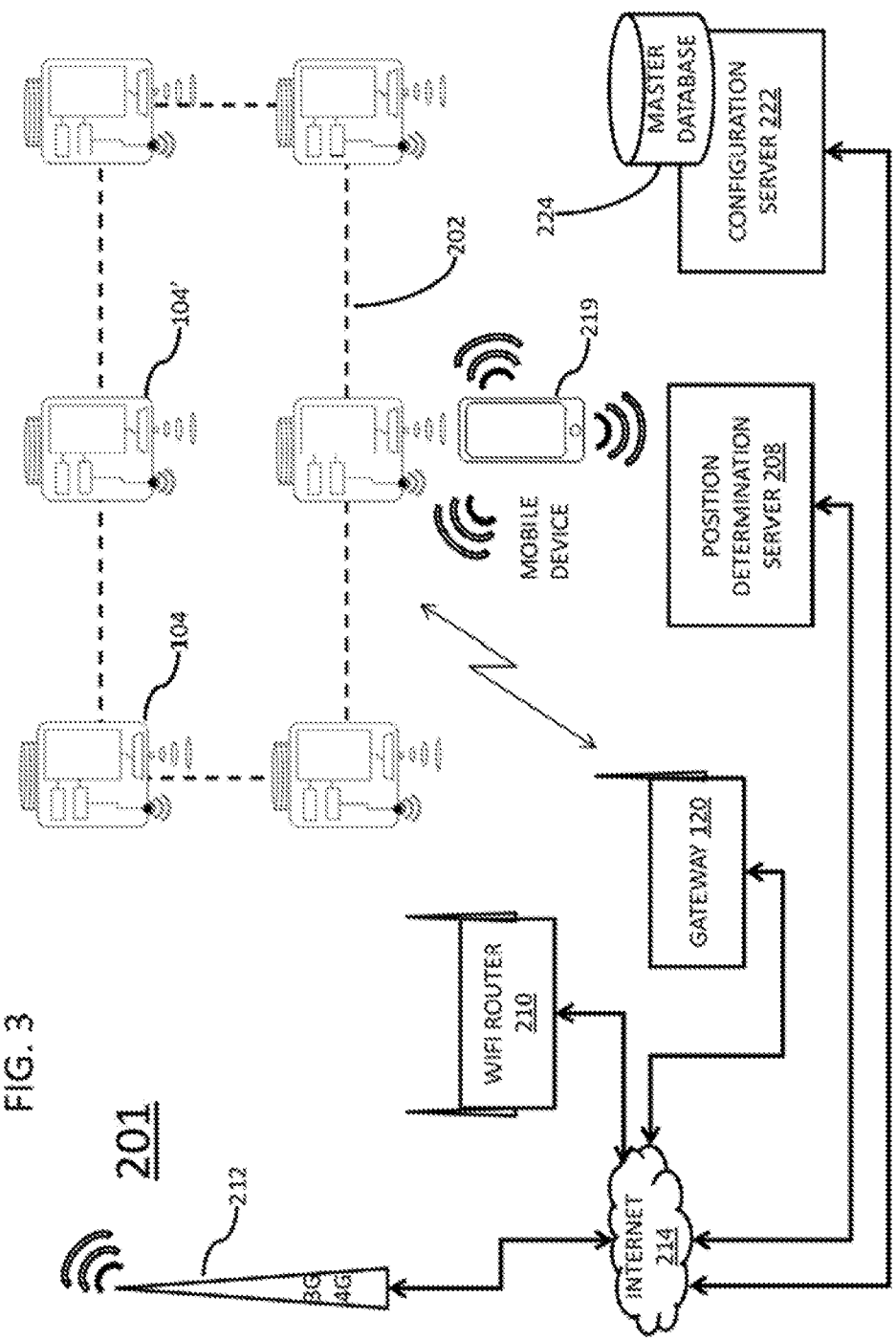
FIG. 3 depicts a system of nodes as lighting devices and network connected resources supporting a command execution synchronization, wherein the nodes are arranged in an ad hoc wireless flooding type network.

FIG. 3 shows an overall system 201 of the nodes 104 as lighting devices and network connected resources supporting a command execution synchronization, wherein the nodes are arranged in an ad hoc wireless network (e.g. flooding type network). In one example, the nodes 104 have the capability to modulate output of the light sources thereof, e.g. for visual light communication (VLC) such as for execution synchronization operations. Firmware for the lighting devices of these examples may be updated over-the-air. The command execution synchronization system includes the actual nodes 104 and other resources such as the gateway 120, servers 208 and 222 and master database 224 that interact with the nodes 104 for command execution synchronization and lighting related functions. Other typical lighting system elements such as wall controllers and/or a centralized (e.g. building or campus wide) lighting controller are omitted for convenience.

The nodes 104 in our examples include wireless transceivers, such as radio-frequency transceivers, for various communication functions, although cable or optical fibers communication resources could be used. In the overall system 201 shown in FIG. 3, the RF enabled modulatable nodes 104 form an ad hoc flooding-type network 202 and optionally/temporarily communicate through the Internet 214, e.g. via the gateway 120, to implement communication aspects of a command execution synchronization techniques/processes like that discussed above relative to FIGS. 1, 1A and 1B.

In one example, there is illustrated a mobile device 219 having a typical RF wireless communication transceivers, e.g. for communication via base station 212 of a public-carrier's mobile communication network and/or for wireless local area data network communication (e.g. WiFi) with a local router 210 in or near the premises served by the nodes 104. These communication capabilities support normal data communications applications for the mobile device 219. These communication capabilities, however, may also be used in some functions/services in relation to light communication synchronization. For example, the configuration server 222 may communicate updates of entries in the master table database 224 to the mobile device 219. The mobile device 219 include cameras and are programmed or otherwise configured to demodulate lighting device ID codes from images captured by the cameras for use in table lookups and related position determination and/or information retrieval functions based on the ID codes received from the lighting devices 104. The mobile devices may use their inherent RF wireless communication capabilities to also communicate through the Internet with other relevant resources represented by position determination server 208, e.g. for assistance in precise position determinations based on multiple ID codes alone or in combination with mobile device orientation data and/or to obtain other position or location related services such as routing instructions or product or service promotions.

In the system 201, the mobile devices 219 function essentially as user devices as described earlier. Positioning related communications of those devices 219 may use the cellular mobile network via a base station 212 or local wireless data network service like WiFi via router 210 provided at or near the relevant premises. As noted, the networked version of the system 201 shown in FIG. 3 implements a wireless (e.g. Bluetooth) ad hoc network 202 formed by the wireless-enabled lighting devices 204. Assuming that ad hoc network 204 has a link to a compatible wireless gateway such as the gateway 120, then the ad hoc network 202 and the gateway 120 may offer yet another data communication path for the mobile devices 219, including for data communications related to the positioning and location based services.

As discussed above, FIG. 3 depicts a configuration of RF enabled modulatable lighting devices arranged in an ad hoc flooding-type network 202 and connected to Internet resources through the nearby gateway 120. Although not shown, the ad hoc flooding-type network 202 may alternatively be temporarily connected to Internet resources through a nearby mobile device. Modulatable nodes 204 may be configured so that a modulated light signal provided from the light of each node 204 may be distinguished from modulated light signals produced by other nearby nodes 204 as well as from light outputs from other unmodulated sources or lighting devices (not shown). When such modulating nodes 204 are configured with RF capability and form a wireless network, they may communicate configuration information from node to node.

As shown, in the example, the system 201 includes the another suitable network-network gateway 120 installed in the vicinity of one or more of the nodes 104 of the system. The gateway 120 in close proximity to one of the networked nodes 104 may enable communication from at least one of the nodes and thus the network 202 through any suitable wireless networking link such as Ethernet, Zigbee, and the like.

In the example of FIG. 3, a mobile device that may have Bluetooth and WiFi and/or cellular communication capabilities may act as a gateway for communicating data to/from RF enabled modulatable lighting devices. If the lighting devices are configured into a network 202 with access via a gateway such as the gateway 120, it may be possible for an Internet resource, such as a position determination server 208, to communicate to a networked lighting devices 104 or 104' by passing data through the Internet 214. This may allow communication of information collected from mobile devices via the RF capability (e.g., identities of devices/users that pass through the area) by one of the lighting devices to a remote server, such as server 208.

Use of mobile devices as gateways between a RF system and another network (e.g., wirelessflood) may be opportunistic: e.g., mobile devices of customers who have installed an app related to the RF flood may be opportunistically enlisted as gateways as the devices move in and out of the flood's RF's working space. Such a gateway function may be used, for example, to effectively increase the bandwidth of data reporting by flood nodes to a server/controller, since under various conditions packets can be communicated more quickly through a gateway than through a series of flood node retransmissions. Gateway transmission may be used alternatively or additionally to transmission through a flood controller node connected to a non-flooding type network: e.g., upon failure of an external-connection node or device, a flood may still be enabled to communicate with a server/controller device acting a gateway, carrying on its various functions while calling for diagnosis and repair of the failure.

In various examples, the position determination server 208 is a general-purpose flood server and controller (back end) that performs functions other than or additional to position determination, issuing commands, such as an update command, to the RF and/or lighting capabilities of one or many network nodes, polling network nodes for information garnered from sensors, and so on. A general-purpose back end may be enabled to understand the locations, movements, and other aspects of mobile devices and other assets within the service area of the RF network flood.

Illustrative capabilities include inventorying, assisted navigation and reality augmentation, RF asset tag location tracking, robot and drone tracking, time-of-day-based control, real-time user-tailored control of active assets (e.g., video displays), security management, routine customer assistance, emergency assistance, ambience adjustment (e.g., music, lighting, and other environmental adjustments in response to sensed user behaviors), and more. In another example, routine scan (advertising) packet broadcasts from Bluetooth-capable mobile devices are detected by the RF capability of nodes, enabling a mode of position estimation of the mobile device based on received signal strength indication (RSSI) and/or node detection pattern. Such estimates may be combined with estimates based on detection of light beacons by a light-sensing capability of the mobile device, e.g., after the device user is prompted to expose their device to light based on detection of their presence by the RF mode.

The configuration server 222 may be implemented as additional programming on the same general purpose computer implementing the position determination server 208. Alternatively, the configuration server 222 may be implemented on a separate network connected general purpose computer platform. Either one or both of the servers 208, 222 may be implemented in a distributed fashion on multiple network connected computers, e.g. to adequately serve a particular traffic load and/or to provide some level of redundant capacity for peak load or for use in the event of a failure of a primary server resource. The master database 224 may be implemented in a storage device of the general purpose computer(s) that implements the server 222 or the server 208, or the gateway 120 or the master database 224 may be implemented in a network connected storage device accessible to the appropriate general purpose server computer(s).

FIG. 4 is a somewhat schematic illustration and a somewhat simplified functional block diagram type representation of one of RF enabled modulatable node 104 of FIG. 1 integrated in a lighting device that may be used in any of the examples of wireless networked lighting system. Implementations of several elements of the example of the node of FIG. 4. Reference numbers used in common in both these drawings refer to the same items. For convenience, the description of these examples will refer to both drawings together, unless otherwise noted.

Figure 5B:
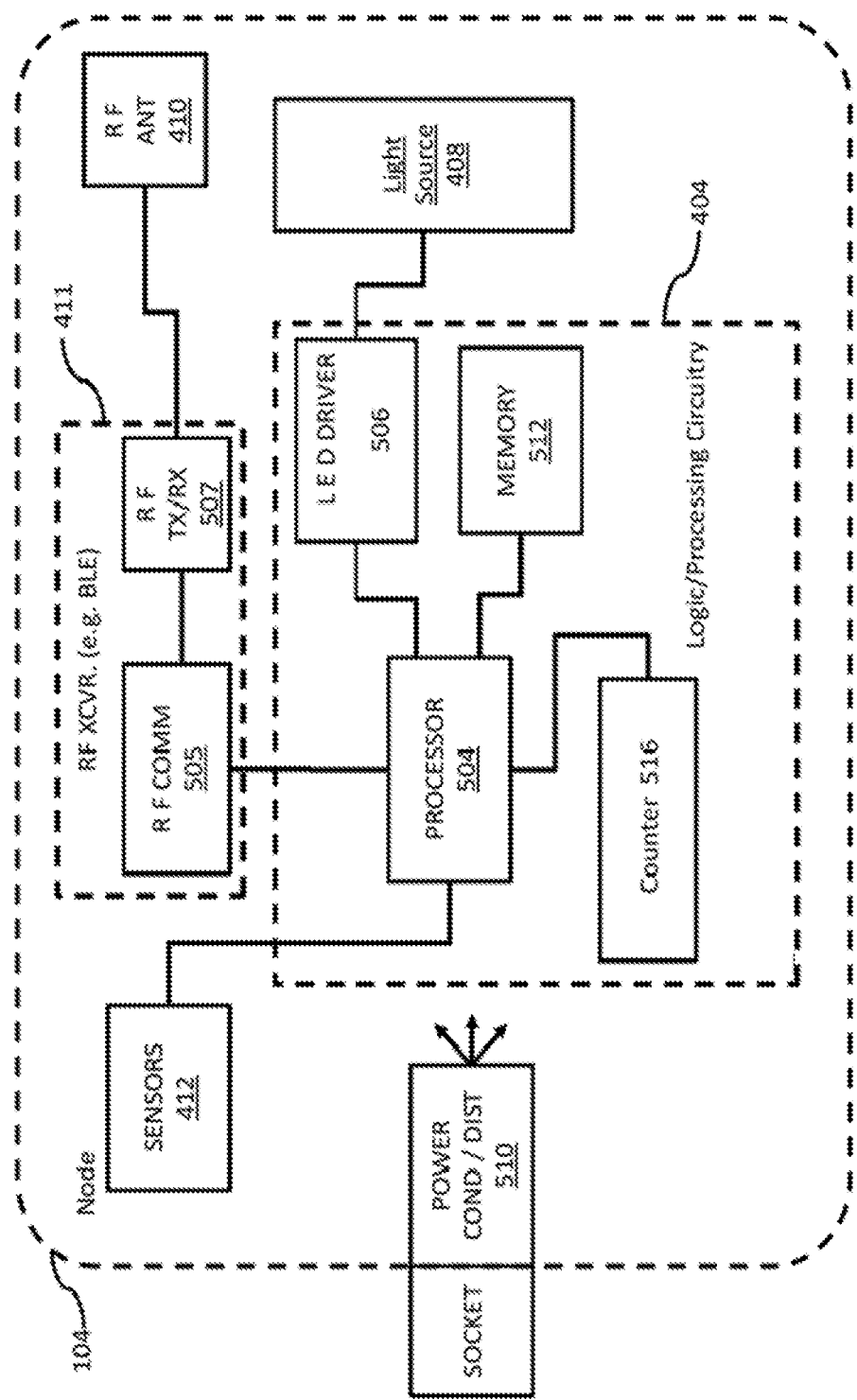
FIG. 5B is a somewhat more detailed functional block diagram of the example node integrated in a lighting device, configured to implement another example of the controlled delay technique provided by the system of FIG. 1.

The example of a node 104 in FIGS. 4, 5A and 5B includes logic and/or processing circuitry 404 to drive and control operations of a light source 408 and control operations of other elements of the node 104. The light source 408 may be any suitable device capable of generating light in response to power that can be modulated. In the one or more light emitting diodes (LEDs) form the light source. The node 104 may include an optical processing element coupled to process the light output from the LED that form the light source 408. Although other optical processing elements may be used, such as diffusers, reflectors, lens and the like.

The logic and/or processing circuitry 404 may include elements such as a processor 504, a driver 506 (e.g. LED driver 506) in the example of FIGS. 5A and 5B) to supply and modulate power to the light source 408, and a memory 512 as a storage device for programming and data. Optionally, the driver 506 may be a controllable driver that modulates the light output according to the modulation scheme used by the node 104.

Although purpose built logic circuitry could be used, the processor 504 typically is implemented by a programmable device such as a microprocessor or a microcontroller, configured to execute programs and process data that facilitate modulation of light from light source 408. A microcontroller typically is a 'system on a chip' that includes a central processing unit (CPU) and internal storage; therefore a microcontroller implementation might incorporate the processor 504 and memory 512 within the microcontroller chip.

The processor 504 controls the driver 506 to vary the power applied to drive the light source 408 to emit light. This control capability may allow control of intensity and/or color characteristics of illumination that the light source 408 provides as output of the node 104. Of note for purposes of discussion of command execution synchronization operations, this control capability causes the driver 506 to vary the power applied to drive light source 408 to cause code modulation of light output of the light output of the light source 408. The processor and/or driver may be configured to implement any of a variety of different light modulation techniques. A few examples of light modulation techniques that may be used include amplitude modulation, optical intensity modulation, amplitude-shift keying, frequency modulation, multi-tone modulation, frequency shift keying (FSK), ON-OFF keying (OOK), pulse width modulation (PWM), pulse position modulation (PPM), ternary manchester encoding (TME) modulation, and digital pulse recognition (DPR) modulation. Other modulation schemes may implement a combination of two or more modulation of these techniques.

As noted, the node 104 in our examples utilize wireless links to communicate, although other communication media and technologies may be adapted to carry communications discussed herein to and/or from the modulatable nodes 104. Hence, our wireless example of FIGS. 4, 5A and 5B includes a radio frequency (RF) wireless transceiver (XCVR) 411 coupled to the logic and/or processing circuitry 404. The transceiver 411 in turn is coupled to an RF transmit/receive antenna 410 that may facilitate communication over wireless RF signals to and/or from other similarly equipped proximal devices, such as other nodes 104, mobile devices 218 or 219, wireless gateway router 220 or other wireless routers or relays, wireless enabled computing devices generally, RF equipped items such as appliances, tools, entertainment devices, RF tags, RF enabled network access points, multi-radio devices, and the like. The RF communication capability offered by transceiver 411 and the antenna 410 supports the various data communications of the lighting device 104 discussed herein, including those related to command execution synchronization.

The RF transceiver 411 may conform to any appropriate RF wireless data communication standard such as wireless Ethernet (commonly referred to as WiFi), SubGig such as Zigbee or other protocols. In the example, however, the RF transceiver 411 is a Bluetooth wireless transceiver, more specifically conforming to the Bluetooth Low Energy (BLE) standard. At a still relatively high level, the BLE transceiver 411 may include RF communication circuitry 505 coupled to the processor 504 and RF transmit (TX) and receive (RX) physical layer circuitry 507 coupled to the RF transmit/receive antenna 410.

The nodes 104 of FIGS. 4, 5A and 5B may further include one or more sensors 412 for detecting aspects of the environment, including electromagnetic emissions from nearby computing devices or others of the nodes 104. As another class of examples, the sensors 412 may include one or more feedback sensors for detecting operational parameters of the node 104, such as the temperature and/or intensity or color characteristics of the light outputs of the light source 408. The sensors 412 may be connected to the processor 404 to facilitate collection, analysis, and communication of sensor data and/or data derived from the sensor data. Sensors may include ultrasonic sensors, video sensors, audio sensors, image sensors, optical sensors, temperature sensors, humidity sensors, air quality sensors, motion detection sensors, chemical sensors, radio frequency sensors, light intensity sensors, light color characteristic sensors, and the like. While the aforementioned sensor examples are contemplated, so are any other types of sensor that may detect an aspect of an environment into which the node 104 may be deployed.

The node 104 also includes power conditioning and distribution circuitry 510 coupled to receive power from the power mains provided to the node 104, through a socket connection in the example of FIGS. 5A and 5B. The power conditioning and distribution circuitry 510 converts the power from the mains to one or more appropriate forms/levels required by the various electronic components of the node 104 and distributes the converted power to those electronic components. Although deriving power from mains is shown and described for convenience, other power sources are contemplated, such as power over data networking, solar power, battery power, etc.

RF communication capabilities typically comply with some network-like standard, such as Bluetooth in our example. A Bluetooth network standard includes unique identifiers for each Bluetooth device that is connected to a wireless network. In a similar way, each RF enabled node 104 may be configured with a unique RF wireless identifier. This RF wireless identifier may be used when determining a position of a properly equipped personal mobile device (e.g., a personal mobile device 219 with an RF capability, a camera capability, and a mobile device application for interacting with at least these two capabilities). While a capability to receive and process such an RF identifier may facilitate coarse device location, it is quite common for two or more RF wireless identifiers to be detectable in any of several positions due to the natural overlap of RF signals from nearby wireless devices. Therefore RF wireless identifiers alone may not be sufficient for fine position resolution. However, combining RF wireless identifier detection with modulated light detection techniques, may improve accuracy and performance.

The RF wireless identifiers modulated on the RF signals output by the transceivers 411 and antennas 410 of the nodes 104 may be inherent identifiers of the transceivers 411, e.g. wireless node IDs modulated on beacon or pilot channel signals broadcast by the transceivers 411 according to the BLE or other applicable wireless standard. Alternatively, the processors 504 may provide positioning/location system related node IDs to the transceivers 411 for inclusion in broadcast data messages.

As illustrated in FIG. 5A, the logic/processing circuitry also includes the software (soft) clock 514, which controlled by the processor 504. The soft clock is a system clock, which functions as a system timer, is continuous pulse that helps the computer clock keep the accurate time. Alternatively, the soft clock 514 may be part of the processor 504. Alternatively, a hardware clock may be used instead of the soft clock. As discussed above, when the node 104 receives the message, the processor 504 functions to run the soft clock 514 such that the soft clock 514 is synchronized to within the timing error tolerance value (2δ). In one example, the processor 504 executes the instruction in the message when the soft clock 514 of the node 104 reaches another or second time identified by the timestamp ($T_A$). As discussed above, the timestamp ($T_A$) identifies a second time ($T_A+\delta$) later than the first time (a time when the message is propagated from the gateway 120 into the network 100) by an amount of time ($\Delta_L$) equal to or greater than a period of delay expected for propagation of the message through to all of the nodes (i.e. $T_A \geq T_I + \Delta_L$).

As illustrated, FIG. 5B depicts another example of the node 104, which includes the same components as the node 104 of FIG. 5A except the logic/processing circuitry 404 does not include the clock 514 (FIG. 5A) and instead includes a counter 516, which controlled by the processor 504. Alternatively, the counter 516 may be part of the processor 504. As discussed above, when the node 104 receives the message, the processor 504 functions to run the counter 516 to modify the count value by the predetermined amount. As discussed above, the count value includes number of transmissions (hop) to propagate the message in the network 100 and count value functions to define a countdown delay time for the node 104 such that the countdown delay time is a time delayed to execute the instruction by the node 104. In one example, the processor 504 executes the instruction in the message at the end of the countdown delay time.

To fully appreciate how one might implement a command execution synchronization, it may be helpful to some readers to consider a specific procedure example implementing flooded RF data communications in a system like those discussed above. By way of such a non-limiting example, FIGS. 6A-6D schematically depict the principles of the message (a.k.a. packet) communication between RF nodes of an illustrative RF flooding procedure 2100 and the control of lights in the flood by such communication according to various examples. As discussed above with respect to FIG. 1, the message includes an instruction for execution and a field for a time delay value. The illustrative RF flooding procedure depicted in FIGS. 6A-6D features six nodes. In this illustrative example, each node may resemble the radio frequency communication enabled light for transmitting modulated light by the node 104 of FIGS. 5A and 5B; that is, each node comprises an RF transceiver capability, a light source, and a light modulation capability. In various examples, nodes 104 may have capabilities other than or additional to those of light and may vary in capability within the flood (e.g., some nodes may possess only RF communications capabilities while some may have both RF and light modulation capabilities).

In the illustrative example, the RF transceiver capability of the nodes in FIGS. 6A-6D is of the digital packet type; that is, each RF transceiver broadcasts bits sequentially according to some physical modulation scheme, and the transmitted bits constitute groups or "packets" of fixed or, in some realizations, variable length. The bits of each packet, as shall be clarified for one illustrative example in FIG. 7, are divided schematically into a string of contiguous fields or sub-groups. The packet fields may include information identifying the packet itself, the transmitter of the packet (e.g., "Node a"), and the intended recipient of the packet (e.g., "all nodes," "Node c," "all nodes in Group Two"); commands (e.g., "turn off your light"); time delay value, data collected by sensors (e.g., temperature); and other information. In one example, the value related to time delay (e.g. a timestamp or a count related to number of transmissions through the nodal wireless network) would be part of the payload in a non-significant part or field of the packet. The broadcast of some packets may be required by an RF interoperability standard, such as the Bluetooth standard; other packets, while conforming to the standard, may be transmitted optionally, and may enwrap information in a manner that constitutes a communications channel. In broadcasting, required packets (e.g., Bluetooth advertisement packets) will preferably be given broadcast priority, and optional packets will be broadcast opportunistically.

The flooding procedure 2100 of FIGS. 6A-6D operates in a waterfall or non-routed fashion: that is, each node transmits packets to all nodes within physical range and receives packets from all nodes within range, and rebroadcasts and/or acts upon each received packet, subject to certain rules, to all nodes within range. Some examples of the rules governing responses to received packets are as follows:

1) When not broadcasting a packet, listen for packets. This implies alternate broadcasting and listening. In various examples where the RF capability of a lighting device includes at least one each of an RF transmitter antenna and receiver antenna, broadcasting and listening may proceed simultaneously.

2) If a packet is detected, extract its identifier (a.k.a., packet ID or identifying information).

3) Store the packet ID in local memory, e.g., the RAM of lighting device 104 in FIG. 3. Also, store the packet ID if originating the packet.

4) Compare received packet ID to packet IDs already in local memory, if any.

5) If the packet ID matches one found in memory, classify the received packet as "seen" and "kill" it: that is, do not act upon any command it contains and do not rebroadcast it.

6) If the packet ID does not match any in memory, examine the packet to see if it contains commands addressed to the receiving node, e.g., "turn on the light" and the time delay value.

7) If the packet does not contain commands addressed to the receiving node and the time delay value, take no action beyond rebroadcasting the packet.

8) If the packet does contain a command addressed to the receiving node and the time delay value, then "consume" the packet: that is, (a) execute the command based on the time delay value and (b) retransmit the packet if and only if the packet is also addressed to other nodes, e.g., if the packet is addressed to a group of nodes.

9) If the packet ID does not match any packet IDs found in local memory and is not consumable by the local node, place the packet in the broadcast queue and, for example, broadcast or "advertise" the packet at the earliest opportunity.

10) Retire each packet ID in local memory after it has been there a certain period of time, e.g., 2 seconds. This permits packet IDs to be re-used after, at minimum, the specified retirement age times the number of nodes in the flooding type wireless network. Re-using of packet IDs is advantageous because (a) otherwise demand for RAM might become large and (b) packet IDs are specified by a fixed number of bits in a packet field and are therefore finite in number, so when unique packet IDs are exhausted one must either cease broadcasting or re-use IDs.

It will be clear to persons versed in the science of network communications that the above rules should be sufficient to assure that packets first broadcast by any node of the flooding type wireless network will be communicated to every other node in the flooding type wireless network and will cease to be rebroadcast by nodes in the flooding type wireless network after a number of broadcast events not greater than the number of nodes in the flooding wireless network and potentially much smaller. It will also be clear that these rules are examples and that in various other examples, rule sets differing in various particulars from the example given, and likely more extensive, would also enable the practical operation of a packet-type, unrouted RF flood (e.g., a BLEmesh). All such variations are contemplated and within the scope of the present discussion, as is the use of network topologies (e.g., bus, ring, star, tree) other than the illustrative flooding type topology of FIGS. 6A-6D.

In the illustrative flooding procedure 2100, each node's RF capability includes or consists essentially of a single antenna that may only transmit or receive at any given time: a node therefore listens for packets except when it is transmitting a packet. While transmitting, a node of the flooding type wireless network may miss (be deaf to) a packet broadcast by one or more other nodes. Although this potentially allows packets to disappear prematurely from the flood, in various examples the RF flood may incorporate at least two features that adequately mitigate the problem of packet-dropping: (1) for a given packet to be dropped by a flooding type wireless network comprising asynchronous nodes, all nodes within receiving range of all other nodes broadcasting that packet must attempt transmission of that packet (or some other) simultaneously, and this is highly unlikely in an asynchronous flood; and (2) as described further herein below, a packet definition standard may permit the inclusion of a response command that requires a receiving node to transmit a confirmation packet back through the flooding type wireless network. Failure by a controller node to receive a response packet may trigger presumption of a packet drop—loss either of the original packet or of the confirmation packet—and thus rebroadcast of the original packet. This process may be repeated until a timeout is reached and a network failure flag is raised or until packet receipt is confirmed.

In FIGS. 6A-6D, the progress of a single packet through an illustrative RF flooding procedure 2100 is schematically illustrated. The packet (not shown) is either delivered to Node a 2102 from a device or network outside the flood or is constructed within Node a 2102 by appropriate devices comprised by the node; or, a packet may originate within any other node in the flooding procedure 2100. In the case illustrated, Node a 2102 broadcasts (advertises) the packet. In FIGS. 6A-6D, receipt of a packet broadcast by a node is indicated by an arrow drawn between the broadcasting node and the receiving node; e.g., in FIG. 6A, the broadcast from Node a 2102 is received by Node b 2104, Node c 2106, and Node d 2108. No other nodes in the flooding procedure 2100 are within physical receiving range of Node a 2102. At the head of each arrow denoting successful transmission, a mark within the receiving node denotes the fate of packet: (1) A check-mark indicates that the node simply re-broadcasts the packet, (2) a bull's-eye indicates that the node consumes the packet (which may or may not entail rebroadcasting), and (c) an "X" indicates that the node kills the packet.

Figure 6A:
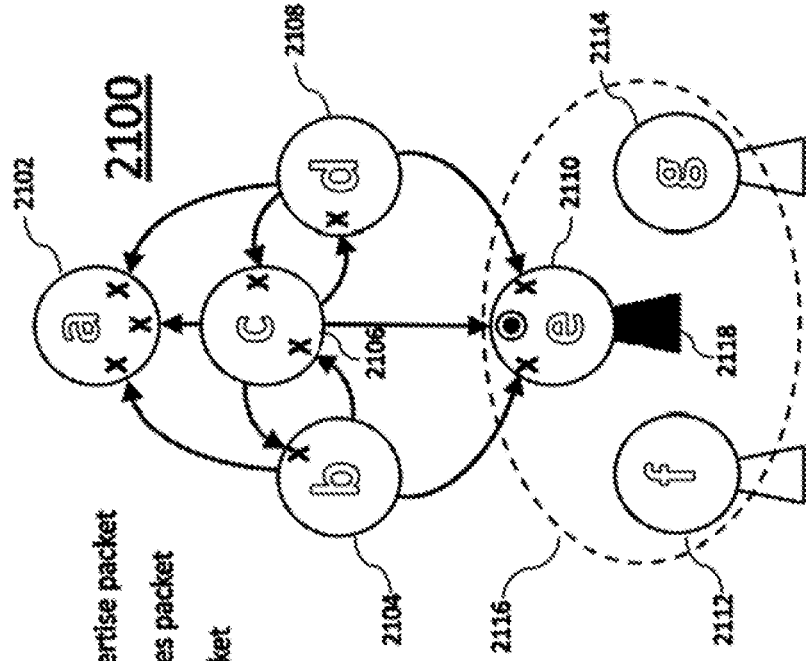
FIG. 6A schematically depicts an illustrative RF flooding type network, such as one of the systems of FIG. 3, in a first state of packet transmission.
Figure 7:
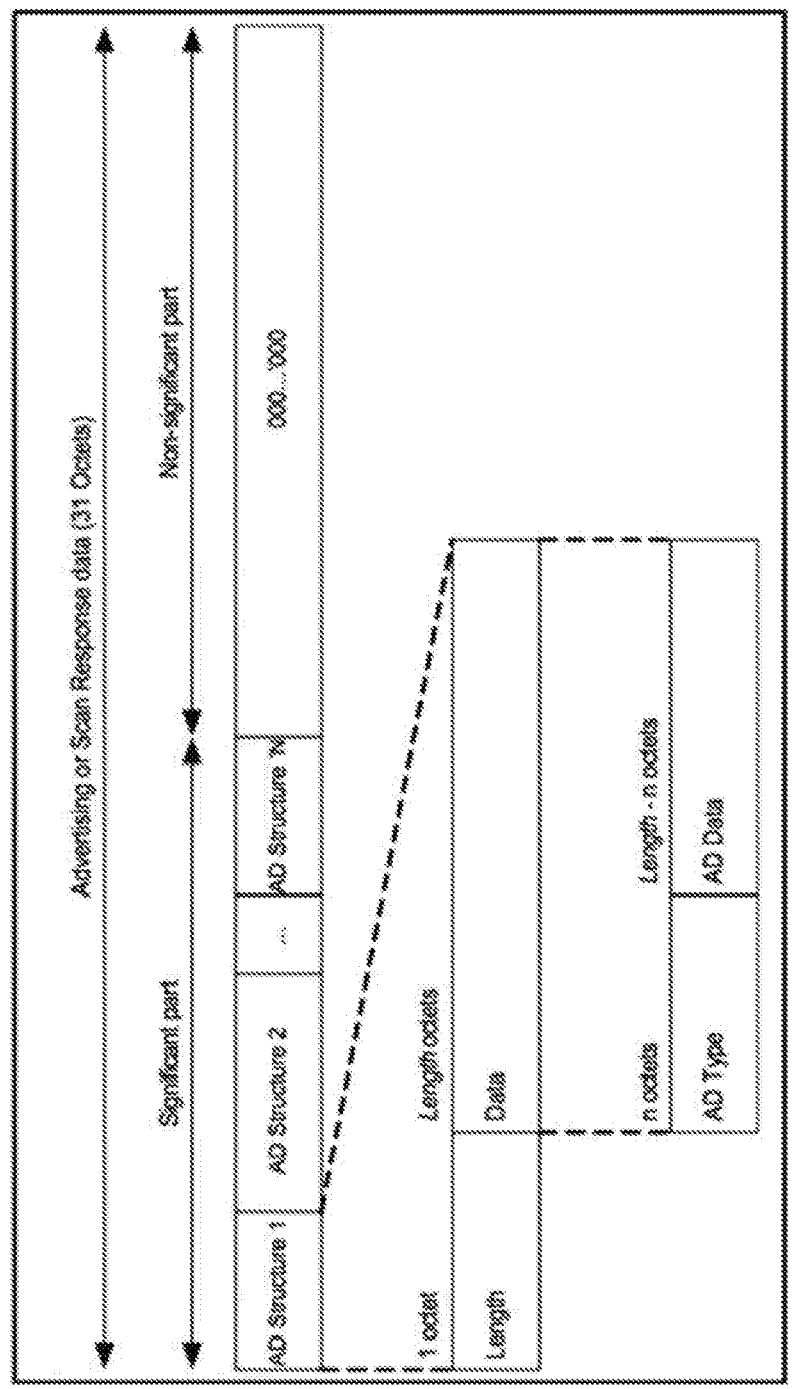
FIG. 7 depicts the structure of an illustrative digital RF packet utilized in one of the systems wireless communication capabilities.

In FIG. 6A, Node e 2110, Node f 2112, and Node g 2114 constitute a group, Group One 2116, within the flooding procedure 2100 (e.g., lighting devices in a particular section of a retail space). The packet protocol of flooding procedure 2100 enables commands be broadcast through the flooding procedure 2100 that are executed by all nodes in Group One 2116 and by no others; nodes in a Group may also be individually addressed and controlled. In the state of flooding operation depicted in FIG. 6A, the light capability of Node e 2110, Node f 2112, and Node g 2114 is On, as indicated by open cones attached to the nodes of Group One 2114 (e.g., cone 2118). The illustrative packet transmitted by Node a 2102 is addressed to the nodes of Group One 2116 and contains a command to turn off the lights.

In FIG. 6A, the broadcast from Node a 2102 has been received by Node b 2104, Node c 2106, and Node d 2108. None of these nodes finds the packet ID in memory, nor find that they are addressed by the packet. They therefore rebroadcast the packet, as indicated by the checkmarks in the node symbols.

Figure 6B:
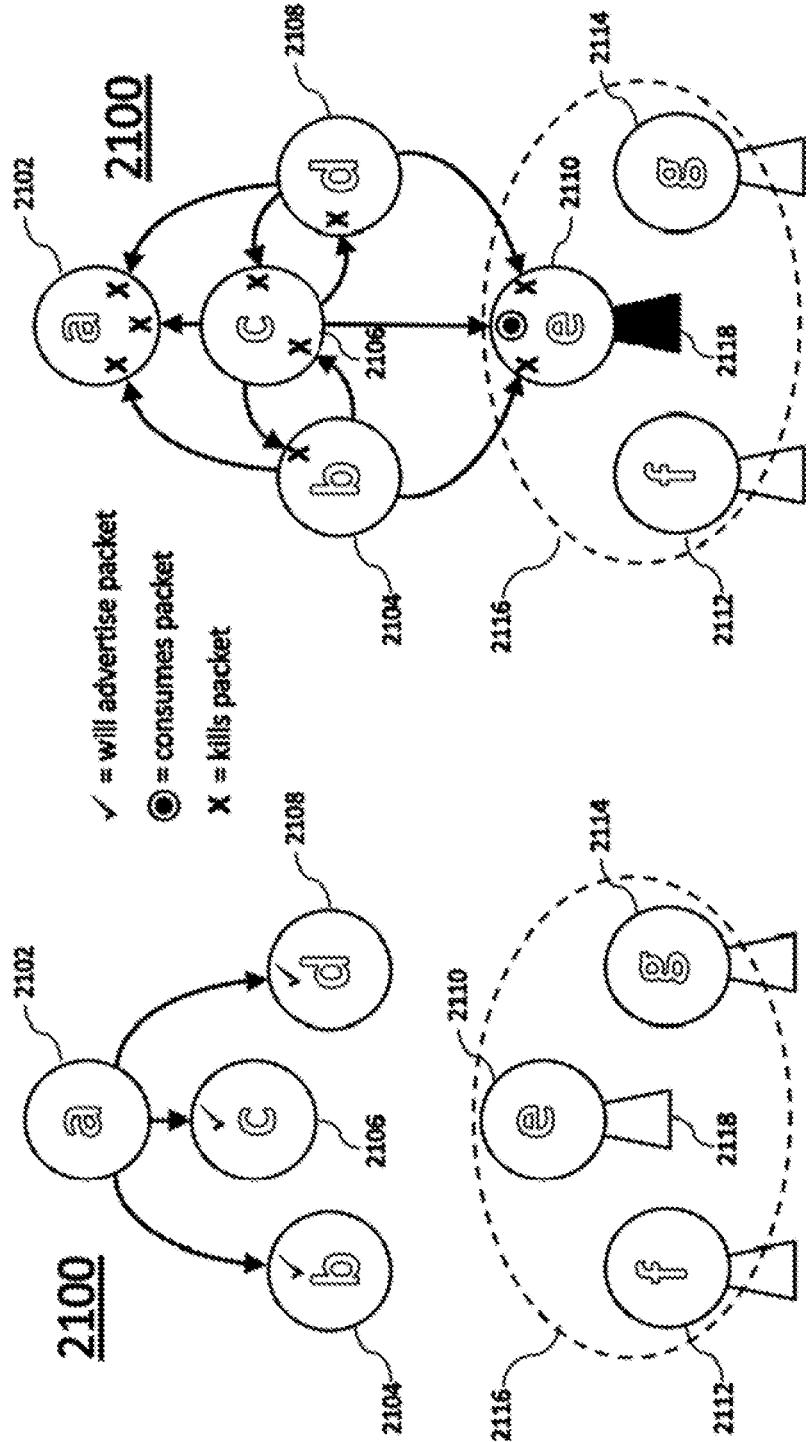
FIG. 6B schematically depicts an illustrative RF flooding type network, such as one of the systems of FIG. 3, in a second state of packet transmission.

FIG. 6B depicts the results of rebroadcast of the packet by Node b 2104, Node c 2106, and Node d 2108. In this illustrative flood, the nodes are presumed to be operating in a non-synchronous manner so that packet collision (simultaneous broadcast of a packet by more than one node) is rare enough to be neglected. Node a 2102 receives the broadcasts of Node b 2104, Node c 2106, and Node d 2108; Node b 2104 receives the broadcast of Node c 2106; Node b 2104 and Node d 2108 are too far apart to receive each other's broadcasts; Node c 2106 receives the broadcasts of Node b 2104 and Node d 2108; and Node d 2108 receives the broadcast of Node c 2106. All packets received by these four nodes are killed, because all nodes find the ID of this packet in their "seen" list. Node e 2110 is the only node in Group One 2116 within receiving range of any of the first four nodes in the flood (a-d) and receives transmissions from Node b 2104, Node c 2106, and Node d 2108. In this illustrative case it is posited that Node c 2106 is the first of these three nodes to rebroadcast the packet; therefore, Node e 2110 first sees the packet as broadcast by Node c 2106, places the packet ID in memory, and kills the packets redundantly received from Node b 2104 and Node d 2108.

Since Node e 2110 is in Group One 2116, to which the packet is addressed, upon examining the packet Node e finds a command addressed to itself and its fellow group members. Node e 2110 therefore consumes the packet, i.e., turns off its light and puts the packet on its broadcast queue. In FIG. 6B, the turning off of the light capability of Node e 2110 is represented by blackening in of the cone 2118.

Figures 6C, 6D:
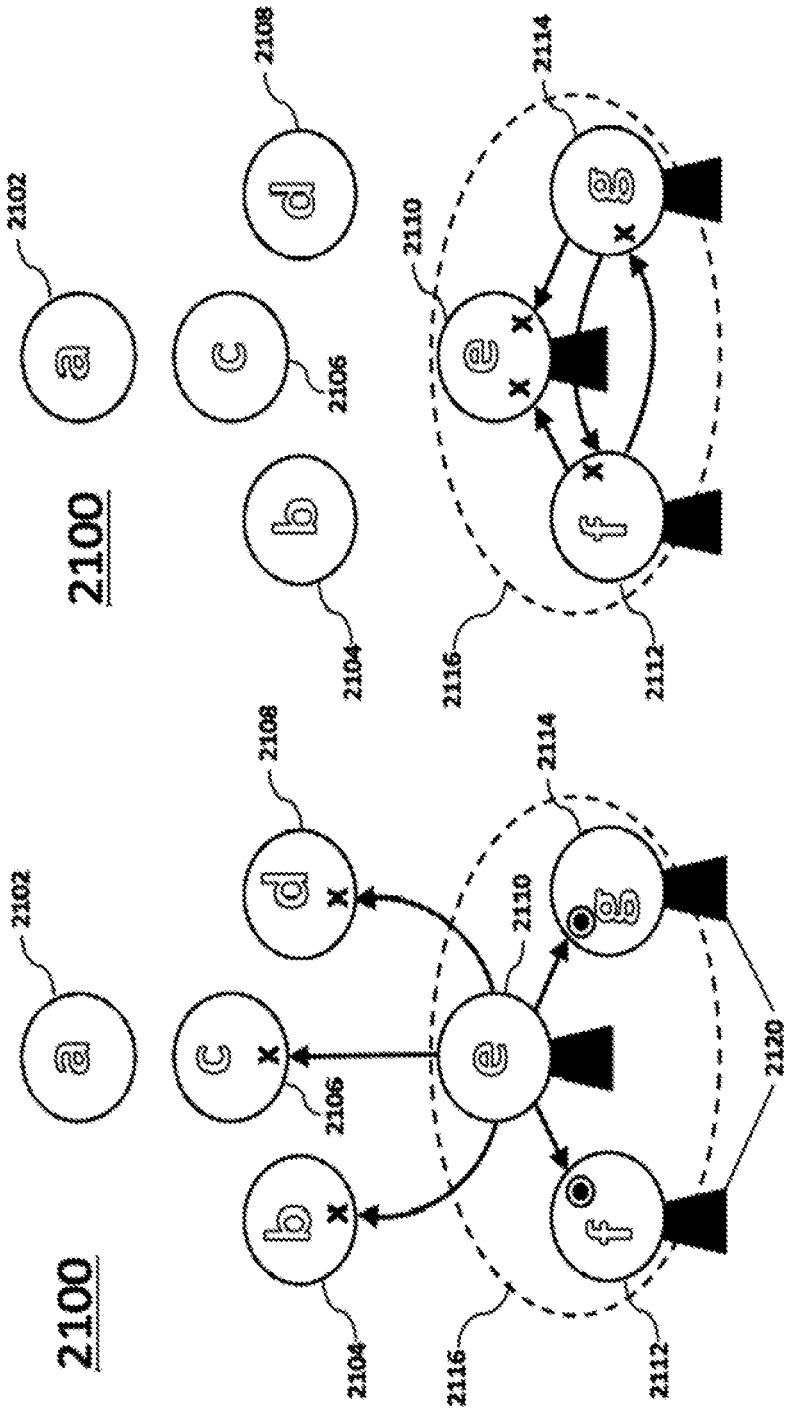
FIG. 6C schematically depicts an illustrative RF flooding type network, such as one of the systems of FIG. 3, in a third state of packet transmission.
FIG. 6D schematically depicts an illustrative RF flooding type network, such as one of the systems of FIG. 3, in a fourth state of packet transmission.

FIG. 6C depicts a subsequent state of operation of the flooding procedure 2100 in which Node e 2110 has rebroadcast the packet. This broadcast is received by all nodes in the flooding procedure 2100 except node a, which is too distant to receive it. The packet is killed by Node b 2104, Node c 2106, and Node d 2108, as these have already seen the packet, but it is consumed by Node f 2112 and Node g 2114, which turn off their lights (as indicated by blackening in of the cones 2120).

FIG. 6D depicts the final stage in the history of the packet, which is rebroadcast by Node f 2112 and Node g 2114. All nodes in Group One 2116 receive this broadcast packet but all identify it as "seen" and kill it. Thereafter, the packet is no longer broadcast by any node in the network; also, its intended function (control of the lighting devices in Group One 2116) has been accomplished. Similar propagation of various packet types containing data, commands, and the like, whether in this illustrative network or in more extensive networks, may be readily envisaged.

Typically, one node in the flooding procedure 2100 is denoted a "controller," which has unique authority (within a given flood) to issue commands, receive data, and communicate with a device, flood, or network outside the flood. The controller node may be a RF node or another Bluetooth-capable device (e.g., gateway, phone, laptop, server, and joint Bluetooth+WiFi device). In various examples, as is clarified further herein below with reference to FIG. 7, a packet may contain a "command response" field as part of the payload that, set to an active state, instructs addressee nodes to transmit packets acknowledging receipt and execution of the command packet or returning data to the controller. For example, if Node a 2102 of FIGS. 6A-6D were designated a controller, and the packet transmitted in the illustrative packet history included an active command response flag, the state of operation of FIG. 6D would be followed by transmission of response packets by the three nodes of Group One 2116, which response packets would contain information confirming the dousing of the Group's lights and which would cease to propagate through the flooding procedure 2100 only after having been consumed by Node a 2102. In general, a controller may poll other nodes in a flooding procedure 2100 for a range of information, including the operational state of its various capabilities, sensor data, ID data, LED operational history (e.g., current, voltage), ambient temperature, and the like. Also, a controller may issue commands triggering execution synchronization, such as described above in relation to FIGS. 1, 1A and 1B, and other operational parameters of nodes or changing the operational states of lights and RF transceivers, and may demand confirmation of the receipt and execution of such commands, and may communicate with devices, floods, servers, networks, and the like outside the flood.

Commands propagated throughout the flooding type wireless network from a controller may enable a number of functions. Without limitation, these include (a) light brightness control (on, off, dimming, flashing, message programming, etc.), (b) directional control of lights equipped with mechanical activators, (c) lighting device version querying, (d) retrieval of data from sensors, and (e) retrieval of data collected by the RF capability of the flooding type wireless network from mobile devices, tags, other nodes, and the like.

In various examples, provision is made for automatic specification of a controller node, either upon system startup or in the event of failure of the designated controller node; alternatively or additionally, the flood may be configured to operate autonomously in one or more pre-determined default modes in the event that a controller ceases to operate. For example, in the absence of commands from a controller, the flood nodes may be programmed to broadcast beacon ID information and keep the lights on until further notice, and record sensor data in RAM in a wraparound fashion that records a moving window of most-recent readings.

In the example, the flood command and several other types of flood communications use the Bluetooth advertising packet. FIG. 7 depicts by way of a non-limiting example an illustrative advertising packet structure 2200 for the RF wireless flood of a lighting system, according to various examples that employ some forms of the Bluetooth standard for the RF communication. Of course, other protocols or packet formats may be used. Typically, a Bluetooth device is required to transmit packets containing constrained, self-identifying content on a regular basis. Other packets may be transmitted optionally by the device. In various examples, the optional packets, herein termed RF packets, may be structured to perform the functions of flood control, illumination control, VLC control, tag sensing, sensor reporting, mobile device detection, and other as described elsewhere herein. The following paragraphs describe the structure of RF packets (using the Bluetooth advertising packet format) employed by the RF aspect of a RF flood.

Each RF packet in Bluetooth version 4.x may be for example, 31 bytes long, where a byte is defined as 8 bits (an octet). Each packet may be an Advertising packet (i.e., a packet containing identification or command information) or a Scan Response packet (i.e., a packet containing data solicited by a controller, including information about receipt of Advertising packets, execution of commands therein, etc.); Advertising and Scan/Command Response packets differ in function and content, but not in format. Each packet comprises a Significant Part and a Non-significant Part; the Significant Part may occupy the whole of the packet. Within the Significant Part, a packet payload may be broken down into a collection of Advertisement Data (AD) Structures, each, as indicated in FIG. 7, composed of a single byte specifying the length of the AD Structure, a single byte specifying the AD Structure type, and some number of bytes of AD Data. In one example, the packet payload in a RF communication includes the command and a parameter related to time delay. In one example, the time delay parameter (e.g. jump count or timestamp) would be part of the payload in the Non-significant Part of the packet field. The payload in an RF communication often is limited by protocol with respect to the number of bytes the payload can carry in the packet. For example, the Bluetooth specification defines the packet to be 31 bytes. Therefore, all communication needs to be contained within these bytes. Alternatively, one could send multiple messages per command by indicating in the payload that this command is made of X messages. Each payload has a sequence number. The command will only be complete if all sequence numbers are received by the node.

In an example, the RF packet contains a single AD Structure that may occupy up to the whole 31 bytes of the packet; this maximizes the non-overhead payload content of the packet. Thus, of the 31 packet bytes, 1 is occupied by the AD Length specification byte, 1 is occupied by the AD Type specification byte, and up to 29 bytes are occupied by a Mesh Message or Scan Response Message. The AD Type specification byte is set to 0xFF, the Bluetooth code for "Manufacturer Specific Data", or 0x16, the Bluetooth code for "Service Data." To distinguish a flood packet from other Manufacturer Specific Advertising Data packets that may be sent (e.g., to mobile devices in the working space of the RF system), each flood Message will begin with a fixed RF-Specific Sequence of 2 bytes, fixed at some arbitrary value (e.g., 0xB1BC). Similarly, to distinguish a Scan Response Message packet from other Service Data packets that may be sent, each Scan Response Message will begin with a fixed Service UUID of 2 bytes, fixed at some arbitrary value (e.g., 0xB1BB).

The remainder of the Flood Message or Scan Response Message (up to 27 bytes) consists of encrypted packet contents. Encryption prevents unauthorized users from taking control of the RF network and its functions (e.g., turning lights on and off) or harvesting information from the flood packets. Nodes will decrypt a packet if they determine that it is not on their seen list, and examine its contents to see if they are an addressee of the packet. Encryption may be by a variety of cryptographic techniques: in one example, a reversible cryptographic hash is employed. A portion of the encrypted packet contents (e.g., 2 bytes), possibly up to and including the entire encrypted packet contents is employed as a quasi-unique packet identifier ("quasi"-unique because although the number of possible M-bit strings is large for nontrivial M, it cannot be infinite—hence the need for ID re-use as discussed hereinabove with reference to FIGS. 6A-6D). This packet identifier may be the string employed by nodes for identifying packets as seen or not-seen, as discussed hereinabove with reference to the illustrative flood of FIGS. 6A-6D.

In one example, as part of the RF payload, the packed field indicates the number of transmissions (hops) until a specific node has to wait until it receives this message. Based on the number of transmissions (hops), the countdown delay time (i.e. delta). For example, if the number of transmissions (hops) is 10, then delta may maybe 250 msec; and the node receiving the message with that count waits 250 msc before executing the command. If the number of transmissions (hops) is 3, then delta maybe be 50 msec; and the node receiving the message with that count waits 50 msc. before executing the command is executed.

As known in the data processing and communications arts, a general-purpose computer typically includes a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. firmware revisions. The software code is executable by the general-purpose computer that functions as the configuration server and/or that functions as a mobile terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology to provide relevant aspects of timestamps and countdown delay time sent with instructions in the message to any of the nodes of a synchronization command execution system, in essentially the manner performed in the implementations discussed and illustrated herein.

FIGS. 8 and 9 provide functional block diagram illustrations of general purpose computer hardware platforms. FIG. 8 illustrates a network or host computer platform, as may typically be used to implement a server. FIG. 9 depicts a computer with user interface elements, as may be used to implement a personal computer or other type of work station or terminal device, although the computer of FIG. 9 may also act as a server if appropriately programmed. It is believed that those skilled in the art are familiar with the structure, programming and general operation of such computer equipment and as a result the drawings should be self-explanatory.

Hardware of a server computer, for example (FIG. 8), includes a data communication interface for packet data communication. The server computer also includes a central processing unit (CPU), in the form of circuitry forming one or more processors, for executing program instructions. The server platform hardware typically includes an internal communication bus, program and/or data storage for various programs and data files to be processed and/or communicated by the server computer, although the server computer often receives programming and data via network communications. The hardware elements, operating systems and programming languages of such server computers are conventional in nature, and it is presumed that those skilled in the art are adequately familiar therewith. Of course, the server functions may be implemented in a distributed fashion on a number of similar hardware platforms, to distribute the processing load.

Hardware of a computer type user terminal device, such as a PC or tablet computer, similarly includes a data communication interface, CPU, main memory and one or more mass storage devices for storing user data and the various executable programs (see FIG. 9). A mobile device (FIG. 10) type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphone type mobile devices include similar but smaller input and output elements. Tablets and other types of smartphone type mobile devices utilize touch sensitive display screens, instead of separate keyboard and cursor control elements. In the example (FIG. 10), the mobile device also includes one or more rolling shutter type cameras, although other types of cameras, image sensors or optical detectors may be used. The hardware elements, operating systems and programming languages of such user terminal devices also are conventional in nature, and it is presumed that those skilled in the art are adequately familiar therewith.

Hence, aspects of the methods of providing command execution synchronization to lighting devices of a lighting system outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming and/or the relevant data. All or portions of the software and/or the relevant data may at times be communicated through the Internet or various other telecommunication networks. Such communications, for example, may enable loading of the programming and the database from one computer or processor into another, for example, from a management server or host computer of the command execution synchronization provider into the computer platform of the configuration that is active and on-line to perform the relevant server functions in an actual working environment. Thus, another type of media that may bear the software elements and data includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that includes the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method comprising:
   starting at a first time propagating a message in a nodal network comprising a plurality of wireless communication nodes (nodes) in the nodal network, the message including an instruction and a timestamp, wherein:
   each node among the plurality of nodes includes a respective light source, and
   the timestamp identifies a second time later than the first time by an amount of time equal to or greater than a period of delay expected for propagation of the message through the nodal network to all of the nodes;
   running a software clock (soft clock) in each of the nodes, the soft clock being synchronized to within a timing error tolerance value of soft clocks in other of the nodes, wherein the timing error tolerance value corresponds to a timing difference sufficiently minimal that execution of the instruction by all of the nodes is perceived as a substantially simultaneous execution in response to the soft clocks of the nodes reaching the second time identified by the timestamp;
   reaching the second time identified by the timestamp at the respective nodes; and
   executing, by each respective one of the nodes, the instruction in response to the soft clock of the respective nodes reaching the second time identified by the timestamp, wherein:
   the executing the instruction by the nodes comprises controlling a perceptible operation of the respective light source, and
   the controlling of the perceptible operation of each respective light source comprises one of turning the respective light source of each node ON, turning the respective light source of each node OFF, dimming intensity of the respective light source of each node, or changing color of the respective light source of each node.

2. The method of claim 1, wherein the timestamp provides a fixed delay for execution of the instruction by each respective node.

3. The method of claim 2, wherein the timestamp is determined based on layout of the network.

4. The method of claim 1, wherein the propagating of the message comprises at least one or more of the nodes receiving the message and retransmitting the message to other one or more of the nodes.

5. The method of claim 4, wherein the propagating of the message implements a wireless flood through the nodal network.

6. A system comprising:
   a plurality of wireless communication nodes distributed about a space, wherein each of the plurality of wireless communication nodes comprises:
   a light source;
   a wireless communication transceiver;
   and a software clock (soft clock);
   a gateway configured to communicate to each of the plurality of wireless communication nodes via a wireless flooding type network formed by the wireless communication transceivers, the gateway is configured to:
   starting at a first time, propagate, a message via the wireless flooding type network, to each of plurality of wireless communication nodes, the message including an instruction and a timestamp, wherein the timestamp identifies a second time later than the first time by an amount of time equal to or greater than a period of delay expected for propagation of the message through to all of the nodes;

wherein each respective wireless communication node is configured to:
receive, via the wireless flooding type network, the message;
run the soft clock of the respective wireless communication node such that the soft clock of the respective wireless communication node is synchronized to within a timing error tolerance value of soft clocks of other wireless communication nodes;
reach the second time identified by the timestamp; and,
execute the instruction in response to the soft clock of the respective wireless communication node reaching the second time identified by the timestamp, wherein to execute the instruction, each of the wireless communication nodes controls a perceptible operation of a respective light source.

7. A method comprising:
introducing a message into a nodal wireless flooding type network having a plurality of wireless communication nodes, each of the plurality of nodes including a light source, wherein: the message includes an instruction and a field containing a first value of a count related to number of transmissions through the nodal wireless flooding type network, and
the first value of the count defining a first countdown delay time for execution of the instruction;
receiving, by a first wireless communication transceiver of a first node among the plurality of nodes, the message;
recording, at the first node, the instruction and the first value of the count included in the field upon the receipt of the message;
modifying, at the first node, the first value of the count by a predetermined amount to form a second value of the count, wherein the predetermined amount used in modifying the first value of the count to form the second value of the count approximately corresponds to an amount of time for a node among the plurality of nodes to receive, modify, and retransmit a message;
introducing, by the first node, a modified version of the message with the instruction and the second value of the count in the field into the nodal wireless flooding type network;
executing, at the first node, the instruction at an end of the first countdown delay time based on the recorded first value of the count, wherein executing of the instruction comprises controlling a perceptible operation of the light source of the first node; and
receiving, by a second wireless communication transceiver of a second node among the plurality of nodes, the modified message;
recording, at the second node, the instruction and second value of the count; and
executing, at the second node, the instruction at a second countdown delay time based on the recorded second value of the count, wherein the executing of the instruction at the second node comprises controlling the perceptible operation of the light source of the second node.

8. The method of claim 7, wherein the introducing of the message and the introducing of the modified message implement a wireless flooding through the nodal wireless flooding type network.

9. The method of claim 7, wherein the controlling the perceptible operation of the light source comprises one of turning the light source ON, turning the light source OFF, dimming intensity of the light source, or changing color of the light source.

10. The method of claim 7, wherein:
the first countdown delay time defines a length of time for postponing the execution of the instruction by the first node after receipt of the message by the first node; and
the second countdown delay time defines a length of time for postponing the execution of the instruction by the second node after receipt of the modified message by the second node.

11. The method of claim 7 wherein:
the first countdown delay time is a product of the predetermined time and a difference between a maximum count value and the first count value.

12. The method of claim 7 wherein:
the second countdown delay time is a product of the predetermined time and a difference between the maximum count value and the second count value.

13. The method of claim 12, wherein the maximum count value corresponds to a maximum number of message transmissions through the flooding type network expected to be sufficient to communicate the message to all nodes of the flooding type network.

14. The method of claim 7, wherein the message comprises an identification to uniquely identify the message among a plurality of messages propagated into the nodal wireless flooding type network, wherein the message and modified message include the identification.

15. The method of claim 14 further comprising:
ignoring, at the first node and the second node, the message and the modified message based on the identification of the message.

16. The method of claim 7 wherein the modifying comprising incrementing the first value of the count by the predetermined amount.

17. A system comprising:
a plurality of wireless communication nodes (nodes) distributed about a space, wherein each of the plurality nodes comprises:
a light source,
a wireless communication transceiver,
and a counter;
a gateway configured to communicate to each of the plurality of nodes via a nodal wireless flooding type network formed by the wireless communication transceivers, the gateway is configured to:
introduce a message into the nodal wireless flooding type network, wherein:
the message includes an instruction and a field containing a first value of count related to number of transmissions through the nodal wireless flooding type network, and
the first value of the count defining a first countdown delay time for execution of the instruction;
a first node among the plurality of nodes is configured to:
receive the message,
record the instruction and the first value of the count included in the field upon the receipt of the message,
run the respective counter to modify the first value of the count by a predetermined amount to form a second value of the count, wherein the predetermined amount used to modify the first value of the count to form the second value of the count approximately corresponds to an amount of time for a node among the plurality of nodes to receive, modify, and retransmit a message, introduce a modified version of the message with the instruction and the second value of the count in the field into the nodal wireless flooding type network; and execute the instruction at the end of the first countdown delay time based on the recorded first value of the count, wherein executing of the instruction comprises controlling a perceptible operation of the light source of the first node; and a second node among the plurality of nodes, different from the first node, is configured to:

receive the modified message, record the instruction and the second value of the count, and execute the instruction at a second countdown delay time based on the recorded second value of the count, wherein the executing of the instruction at the second node comprises controlling the perceptible operation of the light source of the second node.

18. A system comprising:

a plurality of wireless communication nodes (nodes) distributed about a space, wherein each of the plurality nodes comprises:

a light source, a wireless communication transceiver, and a counter;

a gateway configured to communicate to each of the plurality of nodes via a nodal wireless flooding type network formed by the wireless communication transceivers, the gateway is configured to:

introduce a message into the nodal wireless flooding type network, wherein:

the message includes an instruction and a field containing a first value of count related to number of transmissions through the nodal wireless flooding type network, and the first value of the count defining a first countdown delay time for execution of the instruction;

wherein each of a first group of nodes among the plurality of nodes is configured to:

receive the message, record the instruction and the first value of the count included in the field upon the receipt of the message, run the respective counter to modify the first value of the count by a predetermined amount to form a second value of the count, wherein the predetermined amount used to modify the first value of the count to form the second value of the count approximately corresponds to an amount of time for a node among the plurality of nodes to receive, modify, and retransmit a message, introduce a modified version of the message with the instruction and the second value of the count in the field into the nodal wireless flooding type network, and execute the instruction at the end of the first countdown delay time based on the recorded first value of the count, wherein executing of the instruction comprises controlling a perceptible operation of the light source of each of the first group of nodes; and wherein each of a second group of nodes among the plurality of nodes such that the second group of nodes are different from the first group of nodes, is configured to:

receive the modified message, record the instruction and the second value of the count, and execute the instruction at a second countdown delay time based on the recorded second value of the count, wherein the executing of the instruction at each of the second group of nodes comprises controlling the perceptible operation of the light source.

* * * * *